United States Patent
Jung et al.

(10) Patent No.: US 9,860,874 B2
(45) Date of Patent: Jan. 2, 2018

(54) METHOD AND APPARATUS FOR OPERATING RESOURCE IN WIRELESS COMMUNICATION SYSTEM

(71) Applicant: Samsung Electronics Co., Ltd., Suwon-si, Gyeonggi-do (KR)

(72) Inventors: Byoung-Hoon Jung, Seoul (KR); Hyun-Jeong Kang, Seoul (KR); Seung-Hoon Park, Seoul (KR); Karthik Rangaraj Manavalan, Bangalore (IN); Anil Agiwal, Suwon-si (KR); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 14/851,782

(22) Filed: Sep. 11, 2015

(65) Prior Publication Data

US 2016/0081114 A1 Mar. 17, 2016

Related U.S. Application Data

(60) Provisional application No. 62/049,729, filed on Sep. 12, 2014.

(30) Foreign Application Priority Data

Apr. 30, 2015 (KR) .......................... 10-2015-0061376

(51) Int. Cl.
*H04W 72/04* (2009.01)
*H04W 74/00* (2009.01)
(Continued)

(52) U.S. Cl.
CPC .......... *H04W 72/04* (2013.01); *H04W 84/042* (2013.01)

(58) Field of Classification Search
CPC ......... H04W 74/0808; H04W 74/0816; H04W 72/02; H04W 72/04; H04W 84/042;
(Continued)

(56) References Cited

U.S. PATENT DOCUMENTS 7,602,746 B2 * 10/2009 Calhoun ............... H04W 28/26
   370/328
8,000,716 B2 * 8/2011 Tsao ...................... H04W 16/08
   370/230

(Continued)

FOREIGN PATENT DOCUMENTS

KR    10-2009-0117179 A    11/2009

*Primary Examiner* — Ahmed Elallam
(74) *Attorney, Agent, or Firm* — Jefferson IP Law, LLP

(57) ABSTRACT

A $5^{th}$-Generation (5G) or pre-5G communication system to support a higher data rate beyond a $4^{th}$-Generation (4G) communication system such as long term evolution (LTE) is provided. The method for operating resources by a device included in a first network among a plurality of networks in a wireless communication system where the plurality of networks overlap includes transmitting, to terminals included in the first network, at least one of a beacon signal and a request signal requesting resource allocation information related to adjacent devices respectively included in networks adjacent to the first network, receiving the resource allocation information related to the adjacent devices from the terminals, and reserving a resource to be used for communication based on the received resource allocation information related to the adjacent devices.

20 Claims, 13 Drawing Sheets

(51) Int. Cl.
*H04W 16/10* (2009.01)
*H04W 28/26* (2009.01)
*H04W 84/04* (2009.01)

(58) Field of Classification Search
CPC .......... H04W 72/048; H04W 72/0486; H04W 72/0493; H04W 72/08; H04W 72/082; H04W 72/085; H04W 72/10; H04W 72/12; H04W 72/1226; H04W 72/1231; H04W 72/1252; H04W 74/0825
See application file for complete search history.

(56) References Cited

U.S. PATENT DOCUMENTS

| | | |
|---|---|---|
| 8,494,524 B2 | 7/2013 | Wu |
| 8,737,229 B2* | 5/2014 | Khandekar ........... H04W 16/10 |
| | | 370/237 |
| 8,948,148 B2* | 2/2015 | Yu ....................... H04W 72/044 |
| | | 370/338 |
| 2006/0029073 A1 | 2/2006 | Cervello et al. |
| 2007/0258384 A1 | 11/2007 | Sammour et al. |
| 2009/0279491 A1 | 11/2009 | Kim et al. |
| 2010/0029282 A1* | 2/2010 | Stamoulis ............. H04W 16/10 |
| | | 455/436 |
| 2010/0246548 A1 | 9/2010 | Bahng et al. |
| 2011/0069630 A1 | 3/2011 | Doppler et al. |
| 2011/0205998 A1* | 8/2011 | Hart ................... H04W 72/1226 |
| | | 370/330 |
| 2013/0188572 A1* | 7/2013 | Cheong ................. H04W 72/04 |
| | | 370/329 |
| 2014/0078976 A1* | 3/2014 | Novak .................. H04W 24/02 |
| | | 370/329 |
| 2014/0120932 A1 | 5/2014 | Carmon |
| 2014/0177546 A1* | 6/2014 | Kang ....................... H04L 5/06 |
| | | 370/329 |
| 2016/0066198 A1* | 3/2016 | Wang .................... H04W 16/28 |
| | | 370/338 |
| 2016/0381565 A1* | 12/2016 | Oteri .................... H04W 16/14 |
| | | 370/328 |

* cited by examiner

| 102 | 104 | 106 | 108 | | 110 | 112 |
|---|---|---|---|---|---|---|
| TXOP 1 Start Time | TXOP 1 Duration | TXOP 2 Start Time | TXOP 2 Duration | ... | TXOP n Start Time | TXOP n Duration |

FIG. 1A

| 122 | 124 | 126 | 128 | 130 | 132 | | 134 | 136 | 138 |
|---|---|---|---|---|---|---|---|---|---|
| TXOP 1 Start Time | TXOP 1 Duration | TXOP 1 Bandwidth | TXOP 2 Start Time | TXOP 2 Duration | TXOP 2 Bandwidth | ... | TXOP n Start Time | TXOP n Duration | TXOP 1 Bandwidth |

FIG. 1B

| 202 | 204 | 206 | 208 | 210 | 212 |
|---|---|---|---|---|---|
| TXOP 1 Start Time | TXOP 1 Service Interval | TXOP 1 Duration | TXOP 2 Start Time | TXOP 2 Service Interval | TXOP 2 Duration |

| 214 | 216 | 218 |
|---|---|---|
| TXOP n Start Time | TXOP n Service Interval | TXOP 1 Duration |

FIG.2A

| 222 | 224 | 226 | 228 | 230 | 232 | 234 | 236 |
|---|---|---|---|---|---|---|---|
| TXOP 1 Start Time | TXOP 1 Service Interval | TXOP 1 Duration | TXOP 1 Bandwidth | TXOP 2 Start Time | TXOP 2 Service Interval | TXOP 2 Duration | TXOP 2 Bandwidth |

| 238 | 240 | 242 | 244 |
|---|---|---|---|
| TXOP n Start Time | TXOP n Service Interval | TXOP 1 Duration | TXOP 1 Bandwidth |

FIG.2B

METHOD AND APPARATUS FOR OPERATING RESOURCE IN WIRELESS COMMUNICATION SYSTEM

CROSS-REFERENCE TO RELATED APPLICATION(S)

This application claims the benefit under 35 U.S.C. §119(e) of a U.S. Provisional patent application filed on Sep. 12, 2014 in the U.S. Patent and Trademark Office and assigned Ser. No. 62/049,729 and under 35 U.S.C. §119(a) of a Korean patent application filed on Apr. 30, 2015 in the Korean Intellectual Property Office and assigned Serial number 10-2015-0061376, the entire disclosures of each of which is hereby incorporated herein by reference.

TECHNICAL FIELD

The present disclosure relates to a method and apparatus for operating a resource in a wireless communication system.

BACKGROUND

To satisfy demands for wireless data traffic having increased since commercialization of $4^{th}$-Generation (4G) communication systems, efforts have been made to develop improved 5th-Generation (5G) communication systems or pre-5G communication systems. The 5G communication system or the pre-5G communication system is called a beyond-4G-network communication system or a post-long term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

A wireless communication system is now evolving to support a high data rate and to install many access points (APs), so as to satisfy demands for wireless data traffic and wireless connectivity of continuously increasing terminals. For example, to increase a data rate, a communication system is being developed to improve spectral efficiency and to increase a channel capacity based on various schemes such as orthogonal frequency division multiplexing (OFDM) and MIMO.

In a wireless local area network (WLAN) system, multiple user-MIMO (MU-MIMO) has been used to support a large-volume data service in which multiple users and multiple antennas are used together.

The Institute of Electrical and Electronics Engineers (IEEE) has conducted standardization under consideration of an overlapping basic service sets (OBSS) environment in which overlapping WLANs co-exist to support drastically increasing traffic volume and wireless terminals in WLAN systems.

A medium access control (MAC) protocol based on IEEE 802.11 operating in a contention-based manner regards two or more signal transmissions as a collision if two or more signals are simultaneously transmitted at a particular point in time. Thus, different terminals and APs using the same channel occupy the channel through mutual contentions to use the channel.

In the OBSS environment where overlapping multiple terminals and multiple APs co-exist, the number of terminals and APs using the same channel in the OBSS environment is large, resulting in a high probability of occurrence of a collision. Moreover, terminals beyond their sensing coverages may fail in observing each other and thus attempt transmission, degrading received signal performance, which is referred to as a hidden node problem, and excessively many terminals exist in the sensing coverage and hardly attempt transmission, which is referred to as an exposed node problem. These problems are very serious in the OBSS environment, eventually causing the entire network performance degradation.

Thus, in the OBSS environment where overlapping WLAN networks using the same channel exist, standardization for studying a scheme for alleviating interference between BSSs and improving performance by changing parameters of each BSS, for example, sensing power, channel, transmission power, and beamforming direction, is underway based on IEEE 802.11.

However, for interference control and performance improvement in the OBSS environment where multiple BSSs coexist, a MAC protocol of an existing contention access period (CAP) has a limitation of a contention length increase and a success probability decrease, and a contention-free period (CFP) is operated by reservation of an AP, and a transmission opportunity (TXOP) is allocated to particular users using a particular resource during a particular time. The CFP based on reservation in the OBSS environment attempts transmission without observing a channel condition, and thus is highly likely to collide with a reserved TXOP of another overlapping service set. Moreover, occupancy of a channel for a long time disturbs an operation of a contention period of another service set, causing an unfair resource monopoly. The TXOP operated based on reservation may include at least one of a CFP, a hybrid coordination function controlled channel access (HCCA) period, a power save multi-poll period, and a service period (SP).

Therefore, to prevent performance degradation that may occur in the OBSS environment where multiple overlapping WLAN networks coexist and to improve network efficiency, it is necessary to collect information associated with an adjacent network that may affect a network and exchange and use information between those networks. There are also needs to reserve and use a time resource or a frequency resource in which inter-network interference is minimized based on the collected information associated with the adjacent network, or to select a wireless transmission beam or sector for interference minimization or control transmission power.

Moreover, for efficient resource operation and performance improvement in the OBSS environment, there are needs for a procedure for collecting information of another service set using a station (STA) and a procedure for exchanging information between the STA and an AP as well as a method in which adjacent APs recognize each other and directly exchange information with each other.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for operating a resource of each wireless local area network (WLAN) in an overlapping basic service sets (OBSS) environment where multiple overlapping distribution systems exist.

Another aspect of the present disclosure is to provide an apparatus and method for operating a resource to prevent a collision of each WLAN in an OBSS environment where multiple overlapping distribution systems exist.

Another aspect of the present disclosure is to provide an apparatus and method for operating a resource to reduce a service delay of each WLAN in an OBSS environment where multiple overlapping distribution systems exist.

Another aspect of the present disclosure is to provide an apparatus and method for operating a resource to increase wireless resource efficiency of each WLAN in an OBSS environment where multiple overlapping distribution systems exist.

Another aspect of the present disclosure is to provide an apparatus and method for operating a resource based on the number of possible signal reception devices of each WLAN in an OBSS environment where multiple overlapping distribution systems exist.

Another aspect of the present disclosure is to provide an apparatus and method for collecting information using stations (STAs) of each WLAN in an OBSS environment where multiple overlapping distribution systems exist.

Another aspect of the present disclosure is to provide an apparatus and method for operating a resource based on information collected using STAs of each WLAN in an OBSS environment where multiple overlapping distribution systems exist.

Another aspect of the present disclosure is to provide an apparatus and method for operating a resource for each distribution system in an OBSS environment where multiple overlapping distribution systems exist.

Another aspect of the present disclosure is to provide an apparatus and method for operating a resource to prevent a collision of each distribution system in an OBSS environment where multiple overlapping distribution systems exist.

Another aspect of the present disclosure is to provide an apparatus and method for operating a resource to reduce a service delay of each distribution system in an OBSS environment where multiple overlapping distribution systems exist.

Another aspect of the present disclosure is to provide an apparatus and method for operating a resource to increase wireless resource efficiency of each distribution system in an OBSS environment where multiple overlapping distribution systems exist.

Another aspect of the present disclosure is to provide an apparatus and method for operating a resource based on the number of possible signal reception devices of each distribution system in an OBSS environment where multiple overlapping distribution systems exist.

Another aspect of the present disclosure is to provide an apparatus and method for operating a resource based on a priority of each distribution system in an OBSS environment where multiple overlapping distribution systems exist.

In accordance with an aspect of the present disclosure, a method for operating resources by a device included in a first network among a plurality of networks in a wireless communication system where the plurality of networks overlap is provided. The method includes transmitting, to terminals included in the first network, at least one of a beacon signal and a request signal requesting resource allocation information related to adjacent devices respectively included in networks adjacent to the first network, receiving the resource allocation information related to the adjacent devices from the terminals, and reserving a resource to be used for communication based on the received resource allocation information related to the adjacent devices.

In accordance with another aspect of the present disclosure, a method for operating resources by a terminal included in a first network among a plurality of networks in a wireless communication system where the plurality of networks overlap is provided. The method includes receiving beacon signals from a device included in the first network and adjacent devices respectively included in networks adjacent to the first network, detecting resource allocation information related to the adjacent devices based on the beacon signals received from the adjacent devices and transmitting the detected resource allocation information related to the adjacent devices to the device, and communicating with the device by using a resource reserved by the device based on the resource allocation information related to the adjacent devices.

In accordance with another aspect of the present disclosure, an apparatus for operating resources included in a first network among a plurality of networks in a wireless communication system where the plurality of networks overlap is provided. The apparatus includes a transmitter configured to transmit at least one of a beacon signal and a request signal requesting resource allocation information related to adjacent devices respectively included in networks adjacent to the first network to terminals included in the first network, a receiver configured to receive the resource allocation information related to the adjacent devices from the terminals, and a controller configured to reserve a resource to be used for communication based on the received resource allocation information related to the adjacent devices.

In accordance with another aspect of the present disclosure, there is provided a terminal included in a first network among a plurality of networks in a wireless communication system where the plurality of networks overlap is provided. The terminal includes a receiver configured to receive beacon signals from a device included in the first network and adjacent devices respectively included in networks adjacent to the first network, a controller configured to detect resource allocation information related to the adjacent devices based on the beacon signals received from the adjacent devices, and a transmitter configured to transmit the detected resource allocation information related to the adjacent devices to the device, in which the receiver and the transmitter communicate with the device by using a resource reserved by the device based on the resource allocation information related to the adjacent devices.

Other aspects, advantages, and salient features of the disclosure will become apparent to those skilled in the art from the following detailed description, which, taken in conjunction with the annexed drawings, discloses various embodiments of the present disclosure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A and 1B illustrate an example of resource reservation elements according to an embodiment of the present disclosure;

FIGS. 2A and 2B illustrate an example of resource reservation elements according to an embodiment of the present disclosure;

Throughout the drawings, like reference numerals will be understood to refer to like parts, components, and structures.

DETAILED DESCRIPTION

Figure 3:
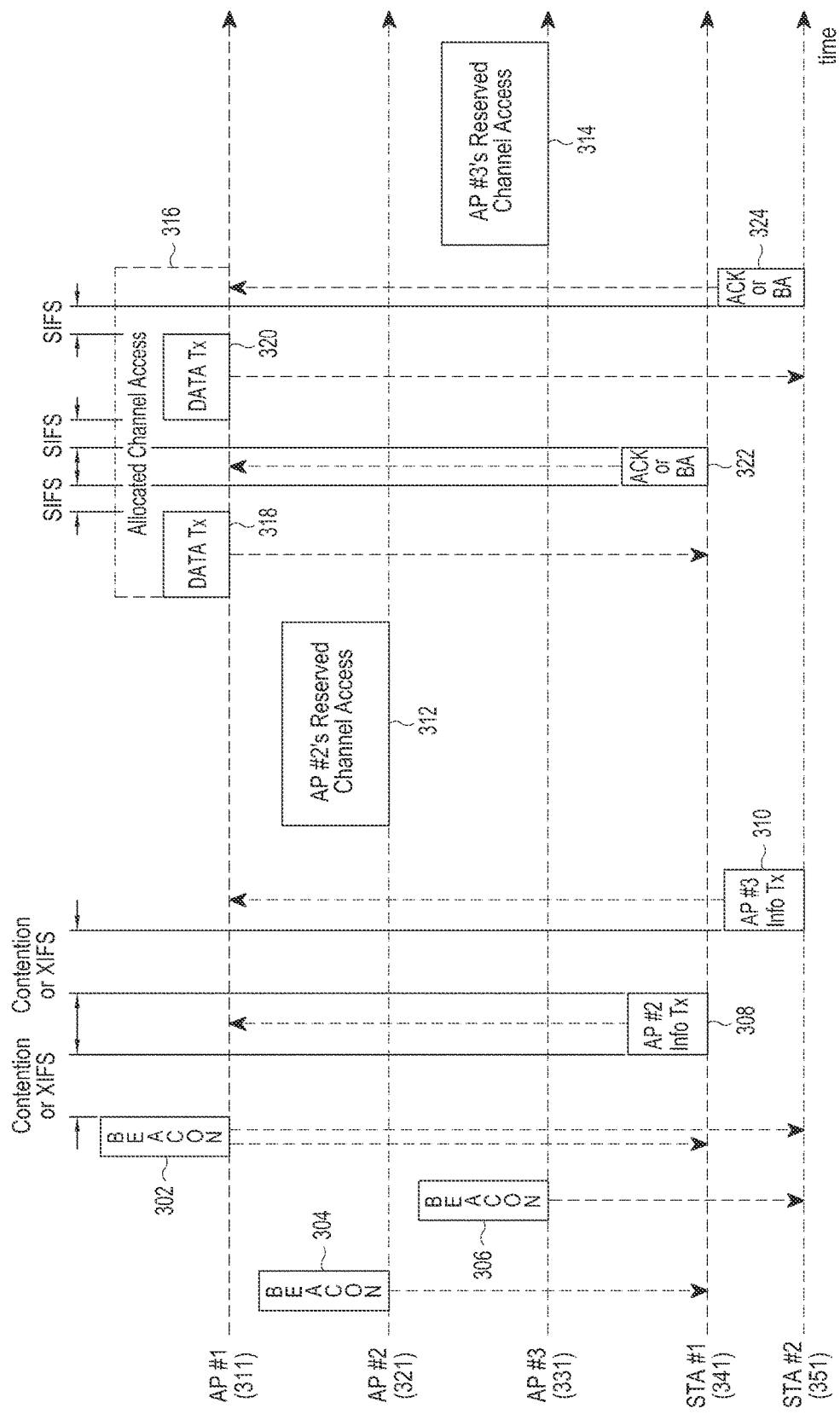
FIG. 3 illustrates an example of a resource operating process for preventing a collision of a wireless local area network (WLAN) network in an overlapping basic service sets (OBSS) environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms such as "first" and "second" used in the various embodiments of the present disclosure may modify various elements of the various embodiments, these terms do not limit the corresponding elements. For example, these terms do not limit an order and/or importance of the corresponding elements. These terms may be used for the purpose of distinguishing one element from another element. For example, a first user device and a second user device all indicate user devices or may indicate different user devices. For example, a first element may be named as a second element without departing from the right scope of the various embodiments of the present disclosure, and similarly, a second element may be named as a first element.

The term "include" or "may include" used in the embodiments of the present disclosure indicates the presence of disclosed corresponding functions, operations, elements, or the like, and does not limit additional one or more functions, operations, elements, or the like. In addition, it should be understood that the term "include" or "has" used in the various embodiments of the present disclosure is to indicate the presence of features, numbers, operations, elements, parts, or a combination thereof described in the specifications, and does not preclude the presence or addition of one or more other features, numbers, operations, elements, parts, or a combination thereof.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments.

An electronic device according to various embodiments of the present disclosure may be a device including a fingerprint function or a communication function. For example, the electronic device may be a combination of one or more of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), an moving picture experts group (MPEG-1 or MPEG-2) audio layer 3 (MP3) player, mobile medical equipment, an electronic bracelet, an electronic necklace, an electronic appcessory, a camera, a wearable device (e.g., a head-mounted device (HMD) such as electronic glasses), an electronic cloth, an electronic bracelet, an electronic necklace, an electronic appcessory, an electronic tattoo, and a smart watch.

According to some embodiments of the present disclosure, the electronic device may be a smart home appliance having a communication function. The electronic device may include, for example, a television (TV), a digital versatile disc (DVD) player, audio equipment, a refrigerator, an air conditioner, a vacuum cleaner, an oven, a microwave oven, a laundry machine, an air cleaner, a set-top box, a TV box (e.g., Samsung HomeSync™, Apple TV™, or Google TV™), a game console, an electronic dictionary, an electronic key, a camcorder, and an electronic frame.

According to some embodiments of the present disclosure, the electronic device may include at least one of various medical equipment (e.g., magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., navigation system and gyro compass for ships), avionics, a security device, a vehicle head unit, and an industrial or home robot.

According to some embodiments of the present disclosure, the electronic device may include a part of a furniture or building/structure having a communication function, an electronic board, an electronic signature receiving device, a projector, and various measuring instruments (e.g., a water, electricity, gas, or electric wave measuring device).

The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices.

According to various embodiments of the present disclosure, a station (STA) may be, for example, an electronic device.

According to various embodiments of the present disclosure, for example, an STA may operate as a signal transmission apparatus and a signal reception apparatus, and for example, an AP may operate as a signal transmission apparatus and a signal reception apparatus.

According to various embodiments of the present disclosure, for example, an access point (AP) may operate as a resource operating apparatus.

A method and apparatus proposed in an embodiment of the present disclosure may be applied to various communication systems such as an IEEE 802.11 communication system, an IEEE 802.16 communication system, a mobile broadcasting service such as a digital multimedia broadcasting (DMB) service, a digital video broadcasting-handheld (DVB-H) service, and an advanced television systems committee-mobile/handheld (ATSC-M/H) service, a DVB system such as an internet protocol television (IPTV) service, a MPEG media transport (MMT) system, an evolved packet system (EPS), a long-term evolution (LTE) mobile communication system, an LTE-Advanced (LTE-A) mobile communication system, a high-speed downlink packet access (HSDPA) mobile communication system, a high-speed uplink packet access (HSDPA) mobile communication system, a high rate packet data (HRPD) mobile communication system of the 3rd Generation Project Partnership 2 (3GPP2), a wideband code division multiple access (WCDMA) mobile communication system of the 3GPP2, a CDMA mobile communication system of the 3GPP2, a Mobile internet protocol (IP) system, and so forth.

In the following description of an embodiment of the present disclosure, the WLAN system is assumed to exist in an environment where multiple overlapping WLAN systems coexist.

According to an embodiment of the present disclosure, the WLAN system capable of operating a resource by using adjacent basic service set (BSS) information is assumed to include, for example, multiple APs and multiple STAs.

Resource reservation elements that may be included a frame delivering a beacon or other reserved resource allocation information are described below with reference to FIGS. 1A to 2B.

FIGS. 1A and 1B illustrate an example of resource reservation elements according to an embodiment of the present disclosure.

Referring to FIG. 1A, reserved transmission opportunity (TXOP) elements shown in FIG. 1A may include TXOP 1 Start Time 102, TXOP 1 Duration 104, TXOP 2 Start Time 106, TXOP 2 Duration 108, . . . , TXOP n Start Time 110, and TXOP n Duration 112. Reserved TXOP elements include two elements, for example, a start time at which reservation of an associated TXOP is to be executed and a duration during which reservation of the TXOP lasts.

The start time and the duration of the associated TXOP may be expressed as absolute times, as relative times with respect to a particular time, or as multiples of a pre-agreed particular unit time. The duration may mean an end time at which reservation of the associated TXOP is terminated, and in this case, the end time may be expressed as an absolute time, as a relative time with respect to a particular time, or as a multiple of a pre-agreed particular unit time.

Referring to FIG. 1B, reserved TXOP elements shown in FIG. 1B may include TXOP 1 Start Time 122, TXOP 1 Duration 124, TXOP 1 Bandwidth 126, TXOP 2 Start Time 128, TXOP 2 Duration 130, TXOP 2 Bandwidth 132, . . . , TXOP n Start Time 134, TXOP n Duration 136, and TXOP n Bandwidth 138. That is, the reserved TXOP elements include three elements, for example, a start time at which reservation of an associated TXOP is to be executed, a duration during which reservation of the associated TXOP lasts, and a frequency bandwidth of the associated TXOP.

The start time and the duration of the associated TXOP may be expressed as absolute times, as relative times with respect to a particular time, or as multiples of a pre-agreed particular unit time. The duration may mean an end time at which reservation of the associated TXOP is terminated, and in this case, the end time may be expressed as an absolute time, as a relative time with respect to a particular time, or as a multiple of a pre-agreed particular unit time. The frequency bandwidth may be expressed as an absolute bandwidth, a relative bandwidth with respect to a particular bandwidth, or a multiple of a unit bandwidth. The bandwidth may be a frequency channel.

Although the reserved TXOP elements include information elements associated with resource reservation, for example, a start time, a duration, an end time, a bandwidth, a frequency channel, and the like in FIGS. 1A and 1B, the reserved TXOP elements may also include elements indicating the purpose of reservation and use of a resource. The purpose of reservation and use of a resource may include, for example, whether to perform downlink/uplink multi-user transmission, adjacent AP-related information, such as the number of users using the adjacent AP, a use frequency bandwidth, a use frequency channel, a timing offset, a beam index, the number of data streams that may be transmitted at the same time, and information associated with a particular frame such as an uplink/downlink resource allocation request. The reserved TXOP elements may include an identifier (ID) of an STA or AP that is to use a reserved resource, for example, an association ID (AID), a medium access control (MAC) address, a physical (PHY) address, and an IP address, and may also include other various information.

The resource reservation elements illustrated in FIGS. 1A and 1B may be provided from an AP of an adjacent BSS to an STA through a management frame such as a beacon, a data frame, or other frames delivering reserved resource allocation information, such as an action frame or a response frame with respect to a request frame, or may be transmitted as information collected and re-processed by an STA to an AP of a BSS to which the STA belongs.

FIGS. 2A and 2B illustrate an example of resource reservation elements according to an embodiment of the present disclosure.

Referring to FIGS. 2A and 2B, reserved TXOP elements illustrated in FIG. 2A may include TXOP 1 Start Time 202, TXOP 1 Service Interval 204, TXOP 1 Duration 206, TXOP 2 Start Time 208, TXOP 2 Service Interval 210, TXOP 2 Duration 212, . . . , TXOP n Start Time 214, TXOP n Service Interval 216, and TXOP n Duration 218. The reserved TXOP elements include three elements, for example, a start time at which reservation of an associated TXOP is to be executed, a service interval at which reservation of the associated TXOP is to be executed, and a duration during which reservation of the associated TXOP lasts.

The start time, the service interval, and the duration of the associated TXOP may be expressed as absolute times, relative times with respect to a particular time, or multiples of a pre-agreed particular unit time. The duration may mean an end time at which reservation of the associated TXOP is terminated, and in this case, the end time may be expressed as an absolute time, as a relative time with respect to a particular time, or as a multiple of a pre-agreed particular unit time.

Reserved TXOP elements illustrated in FIG. 2B may include TXOP 1 Start Time 222, TXOP 1 Service Interval 224, TXOP 1 Duration 226, TXOP 1 Bandwidth 228, TXOP 2 Start Time 230, TXOP 2 Service Interval 232, TXOP 2 Duration 234, TXOP 2 Bandwidth 236, . . . , TXOP n Start Time 238, TXOP n Service Interval 240, and TXOP n Duration 242, TXOP n Bandwidth 244. The reserved TXOP elements include four elements, for example, a start time at which reservation of an associated TXOP is to be executed, a service interval at which reservation of the associated TXOP is to be executed, a duration during which reservation of the associated TXOP lasts, and a bandwidth of the associated TXOP.

The start time, the service interval, and the duration of the associated TXOP may be expressed as absolute times, relative times with respect to a particular time, or multiples of a pre-agreed particular unit time. The duration may mean an end time at which reservation of the associated TXOP is terminated, and in this case, the end time may be expressed as an absolute time, as a relative time with respect to a particular time, or as a multiple of a pre-agreed particular unit time. The frequency bandwidth may be expressed as an absolute bandwidth, a relative bandwidth with respect to a particular bandwidth, or a multiple of a unit bandwidth. Herein, the bandwidth may be a frequency channel.

Although the reserved TXOP elements include information elements associated with resource reservation, for example, a start time, a service interval, a duration, an end time, a bandwidth, a frequency channel, and the like in FIGS. 2A and 2B, the reserved TXOP elements may also include elements indicating the purpose of reservation and use of a resource. The purpose of reservation and use of a resource may include, for example, whether to perform downlink/uplink multi-user transmission, adjacent AP-related information, such as the number of users using the adjacent AP, a use frequency bandwidth, a use frequency channel, a timing offset, a beam index, the number of data streams that may be transmitted at the same time, and information associated with a particular frame such as an uplink/downlink resource allocation request.

The reserved TXOP elements may include an ID of an STA or AP that is to use a reserved resource, for example, an AID, a MAC address, a PHY address, and an IP address, and may also include other various information.

The resource reservation elements illustrated in FIGS. 2A and 2B may be provided from an AP of an adjacent BSS to an STA through a management frame such as a beacon, a data frame, or other frames delivering reserved resource allocation information, such as an action frame or a response frame with respect to a request frame, or may be transmitted as information collected and re-processed by an STA to an AP of a BSS to which the STA belongs.

FIG. 3 illustrates an example of a resource operating process for preventing a collision of a WLAN network in an OBSS environment according to an embodiment of the present disclosure.

Referring to FIG. 3, the illustrated resource operating process is assumed to be implemented basically in a contention-based manner. However, for TXOP reservation based on reservation by an AP, the resource operating process may be implemented in a non-contention-based manner. A resource operating period implemented in the non-contention-based manner may also include a resource operating period implemented in a contention-based manner. The TXOP may be at least one of a contention-free period (CFP), a hybrid coordination function controlled channel access (HCCA) period, a PSMP period, and an SP.

FIG. 3 assumes an OBSS environment including three overlapping WLAN networks, and assumes that AP #1 311 through AP #3 331 are located in different WLAN networks. It is also assumed that STA #1 341 is in an overlapping area between an WLAN network where the AP #1 311 is located and a WLAN network where the AP #2 321 is located, and STA #2 351 is in an overlapping area between an WLAN network where AP #1 311 is located and a WLAN network where the AP #3 331 is located.

The AP #1 311 through the AP #3 331 transmit beacon signals 302, 304, and 306, respectively, and the STA #1 341 and the STA #2 351 receive the beacon signals. The STA #1 341 receives the beacon signals 302 and 304 transmitted from the AP #1 311 and the AP #2 321, and the STA #2 351 receives the beacon signals 302 and 306 transmitted from the AP #1 311 and the AP #3 331. The beacon signal may include information associated with a TXOP reserved by each of the AP #1 311 through the AP #3 331 by using elements illustrated in FIGS. 1A to 2B.

A beacon signal of adjacent APs or an adjacent AP information broadcast signal may be transmitted in the same channel or sub channel where STAs and a home AP operate, or may be transmitted in a different channel or sub channel. Each STA is allocated with a particular time for scanning from the home AP to scan adjacent channels and receives a beacon signal or an adjacent AP information broadcast signal from an adjacent channel to collect information about the adjacent APs. When having no transmission or reception data, each STA situates an antenna and a radio frequency (RF)-baseband processing chain in a reception mode, scans information received in every interpretable channel, and receives a beacon signal or an adjacent AP information broadcast signal transmitted in an adjacent channel to collect information about adjacent APs. If having one or more antennas and one or more RF-baseband processing chains, each STA uses some of the antennas and the RF-baseband processing chains to scan adjacent channels and receives a beacon signal or an adjacent AP information broadcast signal transmitted in an adjacent channel to collect information about adjacent APs. In this case, each STA may receive a beacon signal of adjacent APs transmitted in the same channel or sub channel.

The STAs may collect resource allocation information of adjacent APs, for example, information associated with a reserved TXOP of the adjacent APs, and provide the collected information associated with the TXOP to the AP #1 311, regardless of an information collection request of an AP. The STAs may collect information about particular APs among the adjacent APs. The particular APs may include, for example, adjacent APs designed by an AP to which the STAs belong, adjacent APs capable of providing information, APs having received signal strengths higher than a predetermined threshold value, or arbitrary APs.

The STAs may modify or change information collected from adjacent APs suitably for a BSS of a WLAN network to which the STAs belong. For example, if the adjacent APs operate with different time synchronization than the BSS to which the STAs belong, the STAs collect adjacent AP information time-synchronized with the adjacent AP and modify the adjacent AP information to be time-synchronized with the BSS to which the STAs belong.

An adjacent AP information request frame or an indicator included in a beacon signal for requesting collection of adjacent AP information, which is transmitted from the AP #1 311, may request collection of adjacent AP information in a manner described below.

First, the AP #1 311 may transmit information indicating particular APs existing in particular BSSs among adjacent APs existing in adjacent BSSs through a frame for requesting collection of adjacent AP information. The information indicating the particular APs may include, for example, at least one of an ID of a BSS to which the particular AP belongs, an IP address, a MAC address, and a PHY address of the particular AP.

Second, to collect information about an adjacent AP whose channel environment index measured or estimated by each STA is less than a particular threshold value, the AP #1 311 may transmit the particular threshold value through a frame for requesting collection of adjacent AP information. The channel environment index may be, for example, a signal-to-noise ratio (SNR) of a channel, a signal to interference and noise ratio (SINR) of the channel, and a network occupancy rate in the channel.

Third, to collect information about an adjacent AP whose network environment index measured or estimated by each STA is greater than the particular threshold value, the AP #1 311 may transmit the particular threshold value through a frame for requesting collection of adjacent AP information. The network environment index may be, for example, noise strength of a network, an occupancy rate of another network in a channel, the number of STAs in the network, a load of the network, or a transmission failure/collision probability of the STAs.

Upon receiving beacon signals 302, 304, and 306, the STA #1341 and the STA #2 351 detect resource allocation information reserved by the AP #1 311 through the AP #3 331, for example, information associated with a TXOP. In the following description, the information associated with the TXOP will be referred to as TXOP information. The STA #1 341 and the STA #2 351 may detect the TXOP information each time when receiving a beacon signal or only when receiving a signal for requesting detection of the TXOP information.

Although the STAs receive the beacon signals of AP #2 321 and AP #3 331 before the beacon signal of AP#1 311 in FIG. 3, this illustration is merely an example, and in practice, a position of a beacon signal transmitted by each AP may not be the same as the illustration and the beacon signal may be transmitted from a unspecified position.

The STA #1 341 and the STA #2 351 transmit resource allocation information of adjacent APs, for example, TXOP information 308 and 310 to the AP #1 311 after a predetermined time from reception of the beacon signal 302 of the AP #1 311. A time between a transmission time of the beacon signal 302 by the AP #1 311 and a transmission time of the TXOP information 308 of the AP #2 321 by the STA #1 341 and a time between a transmission time of the TXOP information 308 of the AP #2 321 by the STA #1 341 and a transmission time of the TXOP information 310 of the AP #3 331 by the STA #2 351 is transmitted through the beacon signal 302 and may be a particular time reserved and allocated by the AP #1 311, a time of predetermined XIFS up to transmission of information by the STA #2 351 from transmission of information through contention or reservation of an AP by the STA #1 341, or a time required for each STA determined by contention to occupy a channel. XIFS indicates an inter frame space (IFS) and includes one of various IFSs such as short IFS (SIFS), distributed IFS (DIFS), point coordination function IFS (PIFS), arbitrated IFS (AIFS), and so forth.

It is assumed that the TXOP information 308 transmitted by the STA #1 341 includes information associated with a TXOP 312 reserved by the AP #2 321 and the TXOP information 310 transmitted by the STA #2 351 includes information associated with a TXOP 314 reserved by the AP #3 331. The TXOP information 308 and 310 may be at least one of resource reservation elements described with reference to FIGS. 1A to 2B.

The AP #1 311 having received the TXOP information 308 and 310 from the STA #1 341 and the STA #2 351 extracts information about adjacent APs (i.e., the AP #2 321 and the AP #3 331) from the TXOP information 308 and 310. The information about the adjacent APs may be roughly divided into an information element associated with resource reservation and an information element associated with a purpose of resource reservation. The information element associated with resource reservation may include, for example, a start time, a duration, an end time, a bandwidth, a frequency channel, and so forth of reserved TXOPs 312 and 314. Information elements associated with the resource reservation purpose may include, for example, whether to perform downlink/uplink multi-user transmission, adjacent AP-related information, such as the number of users using the adjacent AP, a use frequency bandwidth, a use frequency channel, a timing offset, a beam index, the number of data streams that may be transmitted at the same time, and information associated with a particular frame such as an uplink/downlink resource allocation request. The information about the adjacent APs may also include an ID of an STA or AP that is to use a reserved resource, for example, an AID, a MAC address, a PHY address, an IP address, and so forth.

The AP #1 311 having extracted the information about the adjacent APs reserves its TXOP 316 based on the adjacent AP information. That is, the AP #1 311 reserves its TXOP 316 by avoiding the TXOP 312 reserved by the AP #2 321 and the TXOP 314 reserved by the AP #3 331. The AP #1 311 occupies a channel by avoiding channels mainly used by the AP #2 321 and the AP #3 331, or recognizes a channel or a time not used by the AP #2 321 and AP #3 331 to reserve the AP #1 311's TXOP 316 in the channel and the time. The AP #1 311 time-synchronizes with the AP #2 321 and the AP #3 331 by using timing offsets with the AP #2 321 and the AP #3 331, or changes a use frequency bandwidth to a frequency bandwidth that is totally different from those of the AP #2 321 and the AP #3 331.

If the AP #1 311 cannot reserve the TXOP 316 based on the adjacent AP information by avoiding the TXOP 312 reserved by the AP #2 321 and the TXOP 314 reserved by the AP #3 331, the AP #1 311 may reserve and occupy possible resources in such a way that the resources may partially or entirely overlap with resources reserved by adjacent APs. For example, if resources needed by the AP #1 311 for transmission are smaller than resources that may be reserved, the AP #1 311 may be unable to reserve the TXOP 316 by avoiding the TXOP 312 reserved by the AP #2 321 and the TXOP 314 reserved by the AP #3 331.

Referring to FIG. 3, it is assumed that the AP #1 311 sends data signals 318 and 320 to the STA #1 341 and the STA #2 351 and receives acknowledgement (ACK) signals 322 and 324 with respect to the data signals 318 and 320, in the reserved TXOP 316.

In the TXOP 316 reserved by the AP #1 311, not only downlink signal transmission of AP #1 311, but also uplink signal transmission of the STA #1 341 and the STA #2 351 may be performed, and polling-based non-contention information transmission of the AP #1 311 may also be performed. The AP #1 311 may transmit and receive a signal by using a multi-antenna/multi-channel, and may transmit and receive a signal by using a contention-based scheme or an orthogonal frequency division multiple access (OFDMA) scheme. The multi-antenna/multi-channel may be, for example, a single user-multiple input multiple output (SU-MIMO) channel, a multi-user multiple input multiple output (MU-MIMO) channel, or the like.

Figure 4:
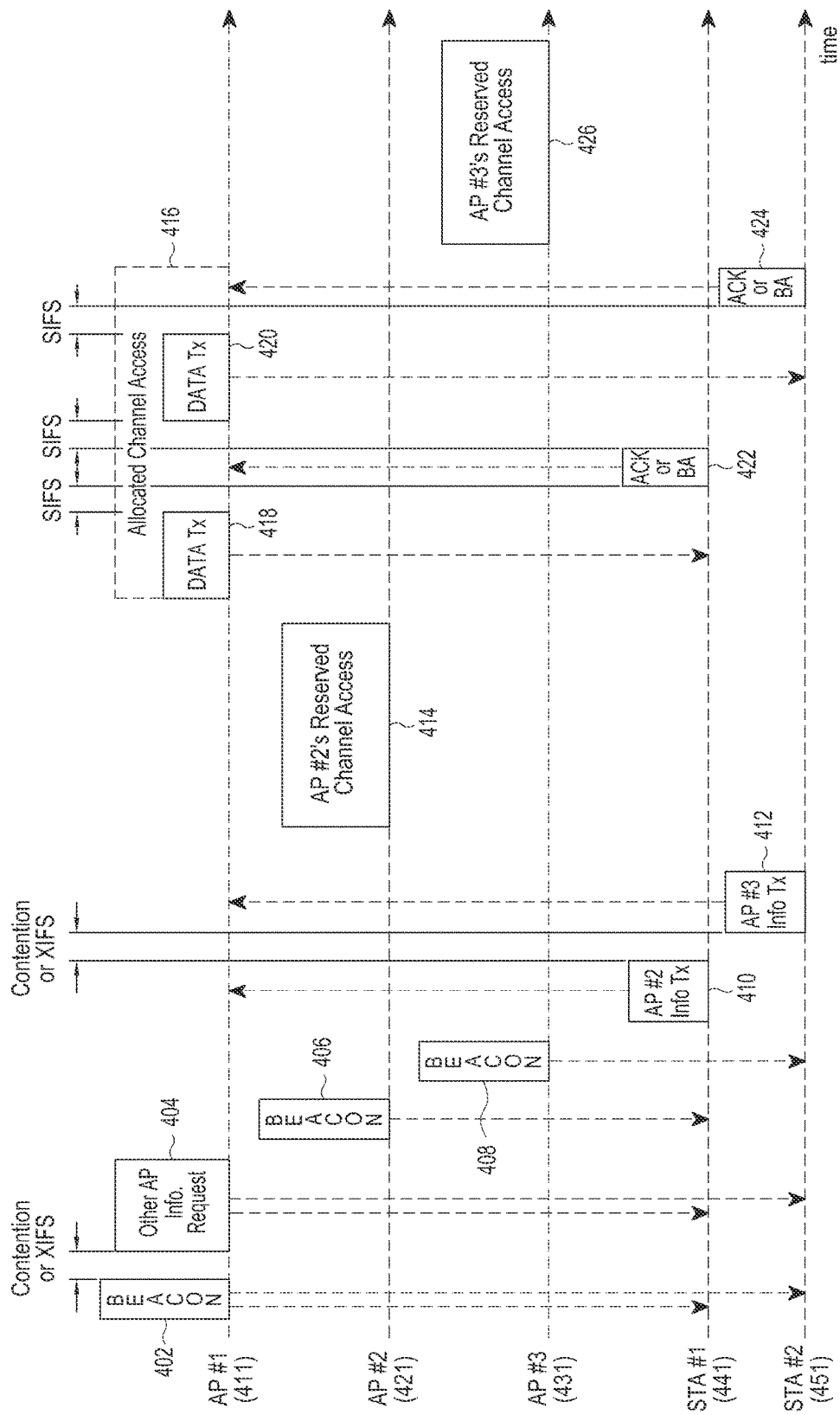
FIG. 4 illustrates an example of a resource operating process for preventing a collision of a WLAN network in an OBSS environment according to an embodiment of the present disclosure.

FIG. 4 illustrates an example of a resource operating process for preventing a collision of a WLAN network in an OBSS environment according to an embodiment of the present disclosure.

Referring to FIG. 4, it is assumed that the illustrated resource operating process is implemented basically in a contention-based manner. However, in case of reservation of a TXOP operated based on reservation of an AP, a resource operating process may be implemented in a non-contention-based manner. A resource operating period implemented in a non-contention-based manner may include a resource operating period implemented in a contention-based manner. The TXOP may be at least one of a CFP, an HCCA period, a PSMP period, and an SP.

FIG. 4 assumes an OBSS environment where three WLAN networks overlap, and also assumes that the AP #1 411 through the AP #3 431 are located in different WLAN networks. The STA #1 441 is located in an overlapping area between a WLAN network where the AP #1 411 is located and a WLAN network where the AP #2 421 is located, and the STA #2 451 is located in an overlapping area between a WLAN network where the AP #1 411 is located and a WLAN network where the AP #3 431 is located.

The AP #1 411 transmits a beacon signal 402 and after a predetermined time, broadcasts an adjacent AP information request signal 404 for requesting adjacent AP information to STAs belonging to a BSS of the AP #1 411. The predetermined time may be a time taken for each STA determined based on a predetermined XIFS or contention to occupy a channel. The XIFS indicates an IFS and includes any one of various IFSs such as an SIFS, a DIFS, a PIFS, an AIFS, and the like. The adjacent AP information request signal 404 may be transmitted in an independent frame form, regardless of a beacon signal, or a beacon signal including information for requesting the adjacent AP information, for example, an indicator, may serve as the adjacent AP information request signal 404.

The STA #1 441 and the STA #2 451 may collect resource allocation information of adjacent APs, for example, a TXOP, regardless of reception of the adjacent AP information request signal, and provide the collected TXOP to the AP #1 411.

The adjacent AP information request signal 404 or the indicator included in the beacon signal to request adjacent AP information, transmitted from the AP #1 411, may request collection of the adjacent AP information in the manner described below.

First, the AP #1 411 may transmit information indicating particular APs existing in particular BSSs among adjacent APs existing in adjacent BSSs through the adjacent AP information request signal. The information indicating the particular APs may include, for example, at least one of an ID of a BSS to which the particular AP belongs, an IP address, a MAC address, and a PHY address of the particular AP.

Second, to collect information about an adjacent AP whose channel environment index measured or estimated by each STA is less than a particular threshold value, the AP #1 411 may transmit the particular threshold value through the adjacent AP information request signal. The channel environment index may be, for example, an SNR of a channel, an SNR of the channel, and a network occupancy rate in the channel.

Third, to collect information about an adjacent AP whose network environment index measured or estimated by each STA is greater than the particular threshold value, the AP #1 411 may transmit the particular threshold value through the adjacent AP information request signal. The network environment index may be, for example, noise strength of a network, an occupancy rate of another network in a channel, the number of STAs in the network, a load of the network, or a transmission failure/collision probability of the STAs.

STA #1 441 and STA #2 451 having received an adjacent AP information request signal 404 from the AP #1 411 receive beacon signals 406 and 408 of the AP #2 421 and the AP #3 431, which are adjacent APs of the AP #1 411, and collect resource allocation information, for example, TXOP information.

Beacon signals or adjacent AP information broadcast signals of adjacent APs may be transmitted in the same channel or sub channel in which STAs and a home AP operate, or in a different channel or sub channel than that channel or sub channel. In this case, each STA is allocated a predetermined time for scanning by the home AP to scan adjacent channels and receives a beacon signal or an adjacent AP information broadcast signal transmitted from an adjacent channel to collect information about the adjacent APs. When having no transmission or reception data, each STA situates an antenna and a RF-baseband processing chain in a reception mode, scans information received in every interpretable channel, and receives a beacon signal or an adjacent AP information broadcast signal transmitted in an adjacent channel to collect information about adjacent APs. If having one or more antennas and one or more RF-baseband processing chains, each STA uses some of the antennas and the RF-baseband processing chains to scan adjacent channels and receives a beacon signal or an adjacent AP information broadcast signal transmitted in an adjacent channel to collect information about adjacent APs. In this case, each STA may receive a beacon signal or an adjacent AP information broadcast signal of adjacent APs transmitted in the same channel or sub channel.

Although the STAs receive the beacon signals of the AP #2 421 and the AP #3 431 before the beacon signal of the AP#1 411 in FIG. 4, in practice, a position of a beacon signal transmitted by each AP may not be the same as the illustration and the beacon signal may be transmitted from a unspecified position.

The STA #1 441 and the STA #2 451 transmit resource allocation information of adjacent APs, for example, TXOP information 410 and 412 to the AP #1 411 after the elapse of a predetermined time from reception of the beacon signal 402 of the AP #1 411. A time between a transmission time of the resource allocation information 410 of the AP #2 421 by the STA #1 441 and a transmission time of the resource allocation information 412 of the AP #3 431 by the STA #2 451 is transmitted through the beacon signal 402 or the adjacent AP information request signal 404 and may be a particular time reserved and allocated by the AP #1 411, a time of predetermined XIFS up to transmission of information by the STA #2 451 from transmission of information through contention or reservation of an AP by the STA #1 441, or a time required for each STA determined by contention to occupy a channel. XIFS indicates an IFS and includes one of various IFSs such as SIFS, DIFS, PIFS, AIFS, and so forth.

It is assumed that the TXOP information 410 transmitted by the STA #1 441 includes information associated with a TXOP 414 reserved by the AP #2 421 and the TXOP information 412 transmitted by the STA #2 451 includes information associated with a TXOP 426 reserved by the AP #3 431. The TXOP information 410 and 412 may be at least one of resource reservation elements described with reference to FIGS. 1 and 2.

The AP #1 411 having received the TXOP information 410 and 412 from the STA #1 441 and the STA #2 451 extracts information about adjacent APs, that is, the AP #2 421 and the AP #3 431 from the TXOP information 410 and 412. The information about the adjacent APs may be roughly divided into an information element associated with resource reservation and an information element associated with a purpose of resource reservation. The information element associated with resource reservation may include, for example, a start time, a duration, an end time, a bandwidth, a frequency channel, and so forth of reserved TXOPs 414 and 416. The information element associated with the resource reservation purpose may include, for example, whether to perform downlink/uplink multi-user transmission, adjacent AP-related information, such as the number of users using the adjacent AP, a use frequency bandwidth, a use frequency channel, a timing offset, a beam index, the number of data streams that may be transmitted at the same time, and information associated with a particular frame such as an uplink/downlink resource allocation request. The information about the adjacent APs may also include an ID of an STA or AP that is to use a reserved resource, for example, an AID, a MAC address, a PHY address, an IP address, and so forth.

The AP #1 411 having extracted the information about the adjacent APs reserves a TXOP 416 based on the adjacent AP information. The AP #1 411 reserves the TXOP 416 by avoiding the TXOP 414 reserved by the AP #2 421 and the TXOP 426 reserved by the AP #3 431. The AP #1 411 occupies a channel by avoiding channels mainly used by the AP #2 421 and the AP #3 431, or recognizes a channel or a time not used by the AP #2 421 and the AP #3 431 to reserve its TXOP 416 in the channel and the time. The AP #1 411 time-synchronizes with the AP #2 421 and the AP #3 431 by using timing offsets with the AP #2 421 and the AP #3 431, or changes a use frequency bandwidth to a frequency bandwidth that is totally different from those of the AP #2 421 and the AP #3 431.

As described above, the AP #1 411 reserves the TXOP 416 by avoiding the TXOP 414 reserved by the AP #2 421 and the TXOP 426 reserved by the AP #3 431. However, if the remaining resources other than the resources reserved by the AP #2 421 and the AP #3 431 are smaller than resources necessary for data transmission of the AP #1 411, the AP #1 411 may reserve and use maximum available resources. The AP #1 411 may reserve and use resources such that the reserved resources overlap with the total resources or a portion of the resources reserved by both or one of the AP #2 421 and the AP #3 431, or one of the AP #2 421 and the AP #3 431, which causes smaller interference, may be selected and the AP #1 411 may reserve and use resources such that the reserved resources overlap with all or some of resources reserved by the selected AP. Although the adjacent APs are the AP #2 421 and the AP #3 431 as an example, for three or more adjacent APs, one AP or a plurality of APs may be selected and resources may be reserved and used such that the reserved resources overlap with all or some of resources reserved by the selected AP.

Referring to FIG. 4, it is assumed that the AP #1 411 transmits data signals 418 and 420 to the STA #1 441 and the STA #2 451 and receives ACK signals 422 and 424 with respect to the data signals 418 and 420, in its reserved TXOP 416.

In the TXOP 416 reserved by the AP #1 411, uplink signal transmission of the STA #1 441 and the STA #2 451 as well as downlink signal transmission of the AP #1 411 may occur, and non-contention information transmission based on polling by the AP #1 411 may also occur. The AP #1 411 may transmit a signal to and receive a signal from STAs by using a multi-antenna/multi-channel, and may transmit and receive a signal by using a contention-based scheme or an OFDMA scheme. The multi-antenna/multi-channel may be, for example, a SU-MIMO channel, a MU-MIMO channel, or the like.

Figure 5:
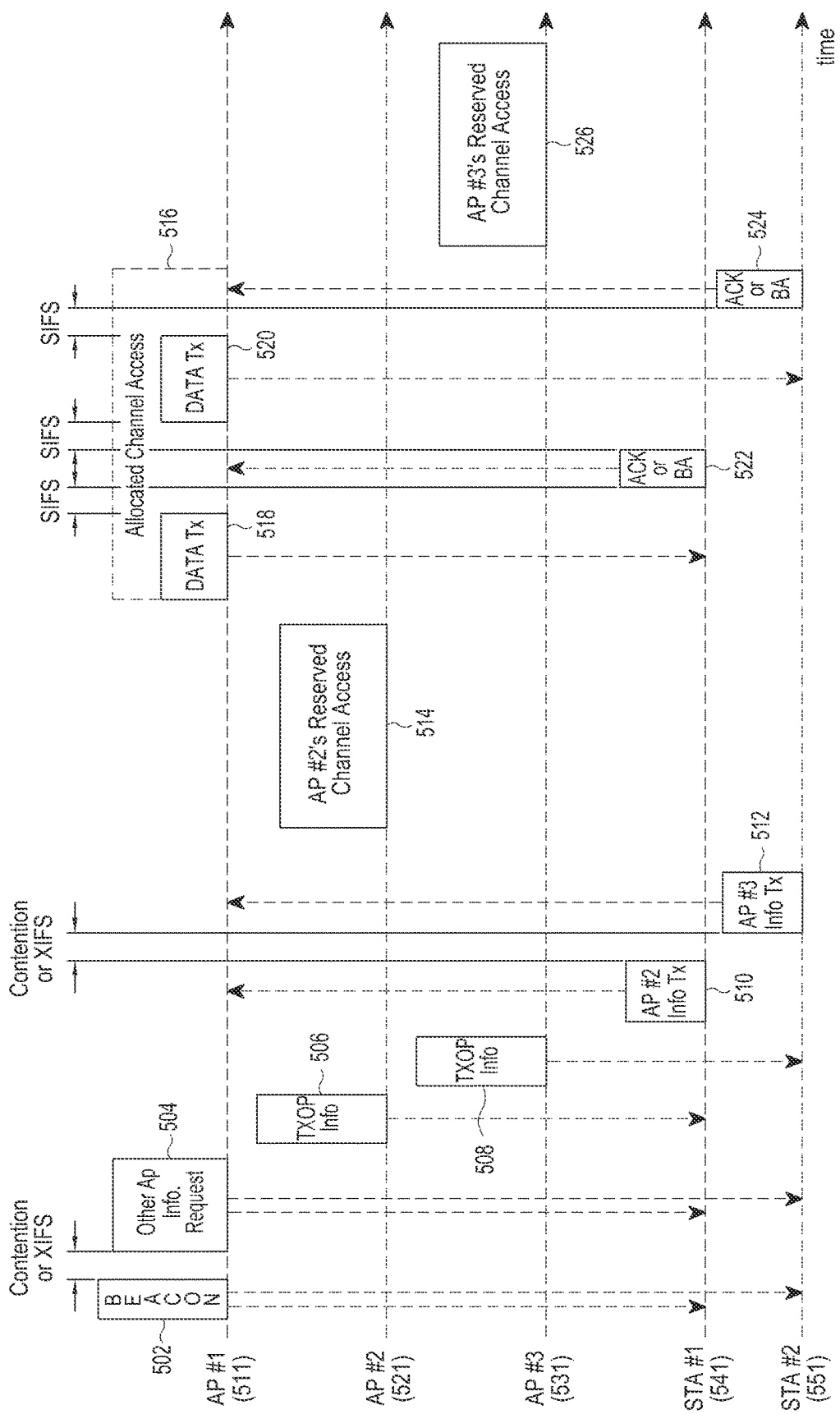
FIG. 5 illustrates an example of a resource operating process for preventing a collision of a WLAN network in an OBSS environment according to an embodiment of the present disclosure.

FIG. 5 illustrates another example of a resource operating process for preventing a collision of a WLAN network in an OBSS environment according to an embodiment of the present disclosure.

Referring to FIG. 5, the illustrated resource operating process is assumed to be basically implemented in a contention-based manner. However, for reservation of a TXOP operated by reservation of an AP, the resource operating process may be implemented in a non-contention-based manner. The resource operating period implemented in the non-contention-based manner may include the resource operating period implemented in the contention-based manner. Herein, the TXOP may be at least one of a CFP, an HCCA period, a PSMP period, and an SP.

FIG. 5 assumes an OBSS environment including three overlapping WLAN networks, and AP #1 511 through AP #3 531 are assumed to be located in different WLAN networks. It is also assumed that STA #1 541 exists in an overlapping area between a WLAN network where the AP #1 511 is located and a WLAN network where the AP #2 521 is located and STA #2 551 exists in an overlapping area between a WLAN network where the AP #1 511 is located and a WLAN network where the AP #3 531 is located.

The AP #1 511 transmits a beacon signal 502, and, after a predetermined time, broadcasts an adjacent AP information request signal 504 for requesting adjacent AP information. The predetermined time may be a time taken for each STA determined based on a predetermined XIFS or contention to occupy a channel. The XIFS indicates an IFS and includes any one of various IFSs such as an SIFS, a DIFS, a PIFS, an AIFS, and the like. The adjacent AP information request signal 504 may be transmitted in an independent frame form, regardless of a beacon signal, or a beacon signal including an indicator for requesting the adjacent AP information may serve as the adjacent AP information request signal 504.

The STA #1 541 and the STA #2 551 may collect resource allocation information of adjacent APs, for example, information associated with a TXOP, regardless of reception of the adjacent AP information request signal, and provide the collected information about the TXOP to the AP #1 511.

The adjacent AP information request signal 504 or the indicator included in the beacon signal to request adjacent AP information, transmitted from the AP #1 511, may request collection of the adjacent AP information in the manner described below.

First, the AP #1 511 may transmit information indicating particular APs existing in particular BSSs among adjacent APs existing in adjacent BSSs through the adjacent AP information request signal. The information indicating the particular APs may include, for example, at least one of an ID of a BSS to which the particular AP belongs, an IP address, a MAC address, and a PHY address of the particular AP.

Second, to collect information about an adjacent AP whose channel environment index measured or estimated by each STA is less than a particular threshold value, the AP #1 511 may transmit the particular threshold value through the adjacent AP information request signal. The channel environment index may be, for example, an SNR of a channel, an SNR of the channel, and a network occupancy rate in the channel.

Third, to collect information about an adjacent AP whose network environment index measured or estimated by each STA is greater than the particular threshold value, the AP #1 511 may transmit the particular threshold value through the adjacent AP information request signal. The network environment index may be, for example, noise strength of a network, an occupancy rate of another network in a channel, the number of STAs in the network, a load of the network, or a transmission failure/collision probability of the STAs.

The STA #1 541 and the STA #2 551 having received an adjacent AP information request signal 504 from the AP #1 511 receive resource allocation information broadcast by the AP #2 521 and the AP #3 531, which are adjacent APs of the AP #1 511, for example, signals 506 and 508 including a TXOP and collect the TXOP.

A beacon signal of adjacent APs or an adjacent AP information broadcast signal may be transmitted in the same channel or sub channel where STAs and a home AP operate, or may be transmitted in a different channel or sub channel. In this case, each STA is allocated with a particular time for scanning from the home AP to scan adjacent channels and receives a beacon signal or an adjacent AP information broadcast signal from an adjacent channel to collect information about the adjacent APs. When having no transmission or reception data, each STA situates an antenna and an RF-baseband processing chain in a reception mode, scans information received in every interpretable channel, and receives a beacon signal or an adjacent AP information broadcast signal transmitted in an adjacent channel to collect information about adjacent APs. If having one or more antennas and one or more RF-baseband processing chains, each STA uses some of the antennas and the RF-baseband processing chains to scan adjacent channels and receives a beacon signal or an adjacent AP information broadcast signal transmitted in an adjacent channel to collect information about adjacent APs. In this case, each STA may receive a beacon signal or an adjacent AP information broadcast signal of adjacent APs transmitted in the same channel or sub channel.

The STA #1 541 and the STA #2 551 transmit resource allocation information of adjacent APs, for example, TXOP information 510 and 512 to AP #1 511 after a predetermined time from reception of the beacon signal 502 of the AP #1 511. A time between a transmission time of the TXOP information 510 of the AP #2 521 by the STA #1 541 and a transmission time of the TXOP information 512 of the AP #3 531 by the STA #2 551 is transmitted through the beacon signal 502 or the adjacent AP information request signal 504 and may be a particular time reserved and allocated by the AP #1 511, a time of predetermined XIFS up to transmission of information by the STA #2 551 from transmission of information through contention or reservation of an AP by the STA #1 541, or a time required for each STA determined by contention to occupy a channel. XIFS indicates an IFS and includes one of various IFSs such as SIFS, DIFS, PIFS, AIFS, and so forth.

It is assumed that the TXOP information 510 transmitted by the STA #1 541 includes information associated with a TXOP 514 reserved by the AP #2 521 and the TXOP information 512 transmitted by the STA #2 551 includes information associated with a TXOP 526 reserved by the AP #3 531. The TXOP information 510 and 512 may be at least one of the resource reservation elements described with reference to FIGS. 1 and 2.

The AP #1 511 having received the TXOP information 510 and 512 from the STA #1 541 and the STA #2 551 extracts information about adjacent APs, (i.e., the AP #2 521 and the AP #3 531) from the TXOP information 510 and 512. The information about the adjacent APs may be roughly divided into an information element associated with resource reservation and an information element associated with a purpose of resource reservation. The information element associated with resource reservation may include, for example, a start time, a duration, an end time, a bandwidth, a frequency channel, and so forth of the reserved the TXOPs 514 and 526. The information element associated with the resource reservation purpose may include, for example, whether to perform downlink/uplink multi-user transmission, adjacent AP-related information, such as the number of users using the adjacent AP, a use frequency bandwidth, a use frequency channel, a timing offset, a beam index, the number of data streams that may be transmitted at the same time, and information associated with a particular frame such as an uplink/downlink resource allocation request. The information about the adjacent APs may also include an ID of an STA or AP that is to use a reserved resource, for example, an AID, a MAC address, a PHY address, an IP address, and so forth.

The AP #1 511 having extracted the information about the adjacent APs reserves a TXOP 516 based on the adjacent AP information. The AP #1 511 reserves the TXOP 516 by avoiding the TXOP 514 reserved by the AP #2 521 and the TXOP 526 reserved by the AP #3 531. The AP #1 511 occupies a channel by avoiding channels mainly used by the AP #2 521 and the AP #3 531, or recognizes a channel or a time not used by the AP #2 521 and AP #3 331 to reserve the TXOP 516 in the channel and the time. The AP #1 511 time-synchronizes with the AP #2 521 and the AP #3 331 by using timing offsets with the AP #2 521 and the AP #3 531, or changes a use frequency bandwidth to a frequency bandwidth that is totally different from those of the AP #2 521 and the AP #3 531.

As described above, the AP #1 511 reserves the TXOP 516 by avoiding the TXOP 514 reserved by the AP #2 521 and the TXOP 526 reserved by the AP #3 531. However, if the remaining resources other than the resources reserved by the AP #2 521 and the AP #3 531 are smaller than resources necessary for data transmission of the AP #1 511, the AP #1 511 may reserve and use the maximum available resources. The AP #1 511 may reserve and use resources such that the reserved resources overlap with the total resources or a portion of the resources reserved by one or both of the AP #2 521 and the AP #3 531, or one of the AP #2 521 and the AP #3 531, which causes smaller interference, may be selected and the AP #1 511 may reserve and use resources such that the reserved resources overlap with all or some of resources reserved by the selected AP. Although the adjacent APs are the AP #2 521 and the AP #3 531 as an example, for three or more adjacent APs, one AP or a plurality of APs may be selected and resources may be reserved and used such that the reserved resources overlap with all or some of resources reserved by the selected AP.

Referring to FIG. 5, it is assumed that the AP #1 511 transmits data signals 518 and 520 to the STA #1 541 and the STA #2 551 and receives ACK signals 522 and 524 with respect to the data signals 518 and 520, in its reserved TXOP 516.

In the TXOP 516 reserved by the AP #1 511, uplink signal transmission of the STA #1 541 and the STA #2 551 as well as downlink signal transmission of the AP #1 511 may occur, and non-contention information transmission based on polling by the AP #1 511 may also occur. The AP #1 511 may transmit a signal to and receive a signal from STAs by using a multi-antenna/multi-channel, and may transmit and receive a signal by using a contention-based scheme or an OFDMA scheme. The multi-antenna/multi-channel may be, for example, a SU-MIMO channel, a MU-MIMO channel, or the like.

Figure 6:
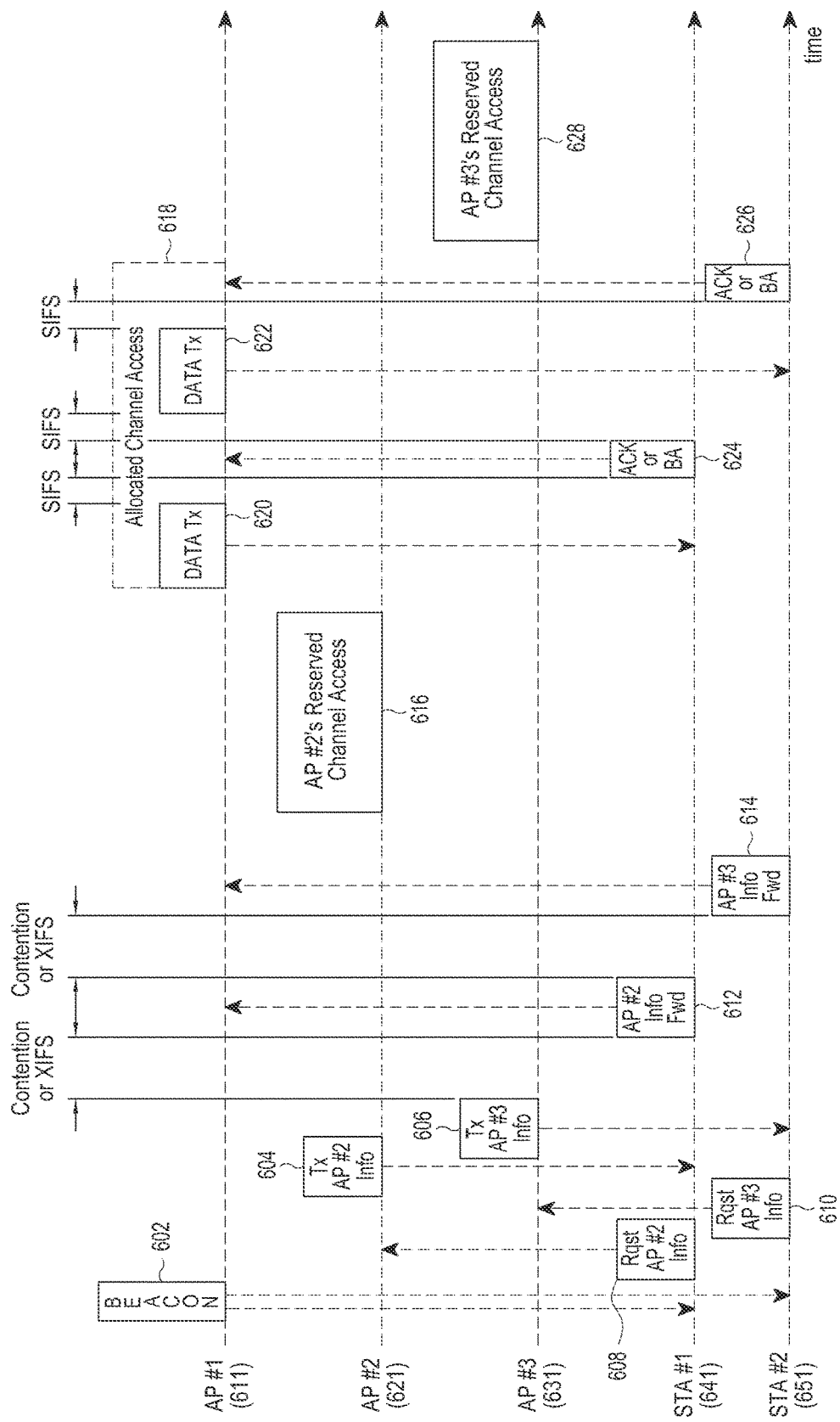
FIG. 6 illustrates an example of a resource operating process for preventing a collision of a WLAN network in an OBSS environment according to an embodiment of the present disclosure.

FIG. 6 illustrates another example of a resource operating process for preventing a collision of a WLAN network in an OBSS environment according to an embodiment of the present disclosure.

Referring to FIG. 6, the illustrated resource operating process is assumed to be basically implemented in a contention-based manner. However, for reservation of a TXOP operated by reservation of an AP, the resource operating process may be implemented in a non-contention-based manner. The resource operating period implemented in the non-contention-based manner may include the resource operating period implemented in the contention-based manner. Herein, the TXOP may be at least one of a CFP, an HCCA period, a PSMP period, and an SP.

FIG. 6 assumes an OBSS environment including three overlapping WLAN networks, and AP #1 611 through AP #3 631 are assumed to be located in different WLAN networks. It is also assumed that STA #1 641 exists in an overlapping area between a WLAN network where the AP #1 611 is located and a WLAN network where the AP #2 621 is located and STA #2 651 exists in an overlapping area between a WLAN network where the AP #1 611 is located and a WLAN network where the AP #3 631 is located.

The AP #1 611 transmits a beacon signal 602 and the STA #1 641 and the STA #2 651 receive the beacon signal 602. It is assumed that the beacon signal includes an indicator for requesting adjacent AP information to serve as an adjacent AP information request signal.

The STA #1 641 and the STA #2 651 may collect resource allocation information of adjacent APs, for example, information associated with a TXOP, regardless of reception of the adjacent AP information request signal, and provide the collected information about the TXOP to the AP #1 611.

The adjacent AP information request signal or the indicator included in the beacon signal to request adjacent AP information, transmitted from the AP #1 611, may request collection of the adjacent AP information in the manner described below.

First, the AP #1 611 may transmit information indicating particular APs existing in particular BSSs among adjacent APs existing in adjacent BSSs through the adjacent AP information request signal. The information indicating the particular APs may include, for example, at least one of an ID of a BSS to which the particular AP belongs, an IP address, a MAC address, and a PHY address of the particular AP.

Second, to collect information about an adjacent AP whose channel environment index measured or estimated by each STA is less than a particular threshold value, the AP #1 611 may transmit the particular threshold value through the adjacent AP information request signal. The channel environment index may be, for example, an SNR of a channel, an SNR of the channel, and a network occupancy rate in the channel.

Third, to collect information about an adjacent AP whose network environment index measured or estimated by each STA is greater than the particular threshold value, the AP #1 611 may transmit the particular threshold value through the adjacent AP information request signal. The network environment index may be, for example, noise strength of a network, an occupancy rate of another network in a channel, the number of STAs in the network, a load of the network, or a transmission failure/collision probability of the STAs.

The STA #1 641 and the STA #2 651 having received the beacon signal 602 including the indicator for requesting the adjacent AP information from the AP #1 611 transmits a resource allocation request signal to adjacent APs. The STA #1 641 transmits a resource allocation request signal 608 to the AP #2 621, and the STA #2 651 transmits a resource allocation request signal 610 to the AP #3 631.

The STA #1 641 and the STA #2 651 receive resource allocation information, for example, TXOP information, in response to the resource allocation request signals 608 and 610. The STA #1 641 receives TXOP information 604 from the AP #2 621, and the STA #2 651 receives TXOP information 606 from the AP #3 631.

A beacon signal of adjacent APs or an adjacent AP information broadcast signal may be transmitted in the same channel or sub channel where STAs and a home AP operate, or may be transmitted in a different channel or sub channel. In this case, each STA is allocated with a particular time for scanning from the home AP to scan adjacent channels and receives a beacon signal or an adjacent AP information broadcast signal from an adjacent channel to collect information about the adjacent APs. When having no transmission or reception data, each STA situates an antenna and a RF-baseband processing chain in a reception mode, scans information received in every interpretable channel, and receives a beacon signal or an adjacent AP information broadcast signal transmitted in an adjacent channel to collect information about adjacent APs. If having one or more antennas and one or more RF-baseband processing chains, each STA uses some of the antennas and the RF-baseband processing chains to scan adjacent channels and receives a beacon signal or an adjacent AP information broadcast signal transmitted in an adjacent channel to collect information about adjacent APs. In this case, each STA may receive a beacon signal or an adjacent AP information broadcast signal of adjacent APs transmitted in the same channel or sub channel.

The STA #1 641 and the STA #2 651 transmit resource allocation information of adjacent APs, for example, TXOP information 612 and 614 to AP #1 611 after a predetermined time from reception of the beacon signal 602 of the AP #1 611. A time between a transmission time of TXOP information 606 of the AP #3 631 and a transmission time of the TXOP information 612 of the AP #2 621 by the STA #1 641 and a time between a transmission time of the TXOP information 612 of the AP #2 621 by the STA #1 641 and a transmission time of the TXOP information 614 of the AP #3 631 by the STA #2 651 are transmitted through the beacon signal 602 and may be a particular time reserved and allocated by the AP #1 611, a time of predetermined XIFS up to transmission of information by the STA #2 651 from transmission of information through contention or reservation of an AP by the STA #1 641, or a time required for each STA determined by contention to occupy a channel. XIFS indicates an IFS and includes one of various IFSs such as SIFS, DIFS, PIFS, AIFS, and so forth.

It is assumed that the TXOP information 612 transmitted by the STA #1 641 includes information associated with a TXOP 616 reserved by the AP #2 621 and the TXOP information 612 transmitted by the STA #2 651 includes information associated with a TXOP 628 reserved by the AP #3 531. The TXOP information 612 and 614 may be at least one of the resource reservation elements described with reference to FIGS. 1A to 2B.

The AP #1 611 having received the TXOP information 612 and 614 from the STA #1 641 and the STA #2 651 extracts information about adjacent APs, (i.e., the AP #2 621 and the AP #3 631) from the TXOP information 612 and 614. The information about the adjacent APs may be roughly divided into an information element associated with resource reservation and an information element associated with a purpose of resource reservation. The information element associated with resource reservation may include, for example, a start time, a duration, an end time, a bandwidth, a frequency channel, and so forth of the reserved TXOPs 616 and 628, and the information element associated with the resource reservation purpose may include, for example, whether to perform downlink/uplink multi-user transmission, adjacent AP-related information, such as the number of users using the adjacent AP, a use frequency bandwidth, a use frequency channel, a timing offset, a beam index, the number of data streams that may be transmitted at the same time, and information associated with a particular frame such as an uplink/downlink resource allocation request. The information about the adjacent APs may also include an ID of an STA or AP that is to use a reserved resource, for example, an AID, a MAC address, a PHY address, an IP address, and so forth.

The AP #1 611 having extracted the information about the adjacent APs reserves a TXOP 618 based on the adjacent AP information. That is, the AP #1 611 reserves the TXOP 618 by avoiding the TXOP 616 reserved by the AP #2 621 and the TXOP 628 reserved by the AP #3 631. The AP #1 611 occupies a channel by avoiding channels mainly used by the AP #2 621 and the AP #3 631, or recognizes a channel or a time not used by the AP #2 621 and AP #3 631 to reserve the TXOP 618 in the channel and the time. The AP #1 611 time-synchronizes with the AP #2 621 and the AP #3 631 by using timing offsets with the AP #2 621 and the AP #3 631, or changes a use frequency bandwidth to a frequency bandwidth that is totally different from those of the AP #2 621 and the AP #3 631.

As described above, the AP #1 611 reserves the TXOP 618 by avoiding the TXOP 616 reserved by the AP #2 621 and the TXOP 628 reserved by the AP #3 631. However, if the remaining resources except for resources reserved by the AP #2 621 and the AP #3 631 are smaller than resources necessary for data transmission of the AP #1 611, the AP #1 611 may reserve and use maximum available resources. The AP #1 611 may reserve and use resources such that the reserved resources overlap with total resources or a portion of the resources reserved by both or one of the AP #2 621 and the AP #3 631, or one of the AP #2 621 and the AP #3 631, which causes smaller interference, may be selected and the AP #1 611 may reserve and use resources such that the reserved resources overlap with all or some of resources reserved by the selected AP. Although the adjacent APs are the AP #2 621 and the AP #3 631 as an example, for three or more adjacent APs, one AP or a plurality of APs may be selected and resources may be reserved and used such that the reserved resources overlap with all or some of resources reserved by the selected AP.

Referring to FIG. 6, it is assumed that the AP #1 611 transmits data signals 620 and 622 to the STA #1 641 and the STA #2 651 and receives ACK signals 624 and 626 with respect to the data signals 620 and 622, in its reserved TXOP 618.

In the TXOP 618 reserved by the AP #1 611, uplink signal transmission of the STA #1 641 and the STA #2 651 as well as downlink signal transmission of the AP #1 611 may occur, and non-contention information transmission based on polling by the AP #1 611 may also occur. The AP #1 611 may transmit a signal to and receive a signal from STAs by using a multi-antenna/multi-channel, and may transmit and receive a signal by using a contention-based scheme or an OFDMA scheme. The multi-antenna/multi-channel may be, for example, a SU-MIMO channel, a MU-MIMO channel, or the like.

Figure 7:
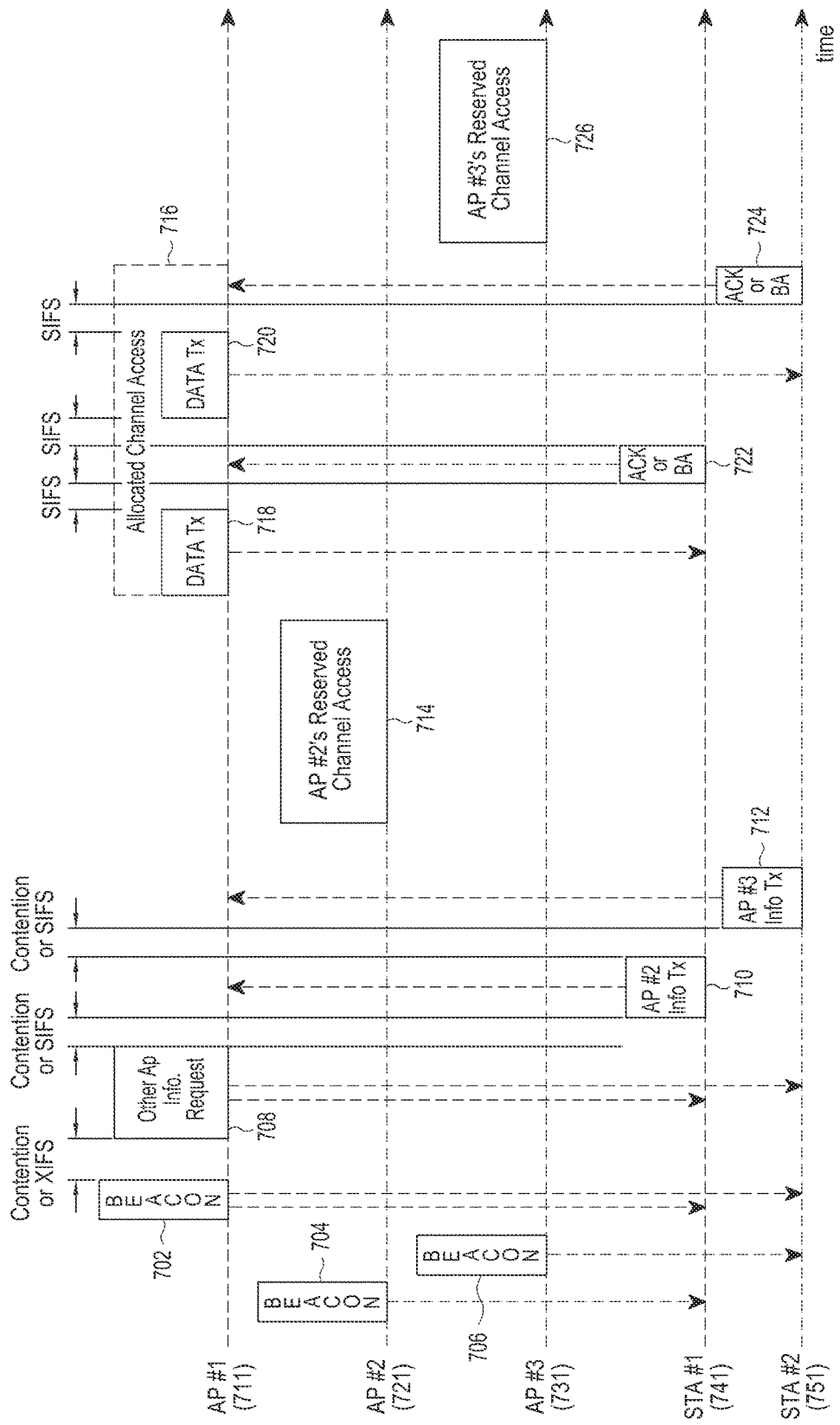
FIG. 7 illustrates an example of a resource operating process for preventing a collision of a WLAN network in an OBSS environment according to an embodiment of the present disclosure.

FIG. 7 illustrates an example of a resource operating process for preventing a collision of a WLAN network in an OBSS environment according to an embodiment of the present disclosure.

Referring to FIG. 7, it is assumed that the illustrated resource operating process is implemented basically in a contention-based manner. However, in case of reservation of a TXOP operated based on reservation of an AP, a resource operating process may be implemented in a non-contention-based manner. A resource operating period implemented in a non-contention-based manner may include a resource operating period implemented in a contention-based manner. The TXOP may be at least one of a CFP, an HCCA period, a PSMP period, and an SP.

FIG. 7 assumes an OBSS environment including three overlapping WLAN networks, and also assumes that the AP #1 711 through the AP #3 731 are located in different WLAN networks. The STA #1 741 is located in an overlapping area between a WLAN network where the AP #1 711 is located and a WLAN network where the AP #2 721 is located, and the STA #2 751 is located in an overlapping area between a WLAN network where the AP #1 711 is located and a WLAN network where the AP #3 731 is located.

The AP #1 711 through the AP #3 731 transmit beacon signals 702, 704, and 706, respectively and the STA #1 741 through the STA #2 751 receive the beacon signals. The STA #1 741 receives the beacon signals 702 and 704 transmitted by the AP #1 711 and the AP #2 721, and the STA #2 751 receive the beacon signals 702 and 706 transmitted by the AP #1 711 and the AP #3 731. The beacon signal may include information associated with a TXOP reserved by each of the APs 711, 721, and 731 by using the elements illustrated in FIG. 1A to 2B.

The AP #1 711 transmits the beacon signal 702 and after a predetermined time, broadcasts an adjacent AP information request signal 708 for requesting adjacent AP information to STAs belonging to a BSS of the AP #1 711. The predetermined time may be a time taken for each STA determined based on a predetermined XIFS or contention to occupy a channel. The XIFS indicates an IFS and includes any one of various IFSs such as an SIFS, a DIFS, a PIFS, an AIFS, and the like. The adjacent AP information request signal 708 may be transmitted in an independent frame form, regardless of a beacon signal, or a beacon signal including an indicator for requesting the adjacent AP information may serve as the adjacent AP information request signal 708.

The adjacent AP information request signal 708 transmitted from the AP #1 711 may request collection of the adjacent AP information in the manner described below.

First, the AP #1 711 may transmit information indicating particular APs existing in particular BSSs among adjacent APs existing in adjacent BSSs through a frame for requesting information about the adjacent APs. The information indicating the particular APs may include, for example, at least one of an ID of a BSS to which the particular AP belongs, an IP address, a MAC address, and a PHY address of the particular AP.

Second, to collect information about an adjacent AP whose channel environment index measured or estimated by each STA is less than a particular threshold value, the AP #1 711 may transmit the particular threshold value through the frame for requesting information about the adjacent APs. The channel environment index may be, for example, an SNR of a channel, an SNR of the channel, and a network occupancy rate in the channel.

Third, to collect information about an adjacent AP whose network environment index measured or estimated by each STA is greater than the particular threshold value, the AP #1 711 may transmit the particular threshold value through the frame for requesting information about the adjacent APs. The network environment index may be, for example, noise strength of a network, an occupancy rate of another network in a channel, the number of STAs in the network, a load of the network, or a transmission failure/collision probability of the STAs.

Upon receiving the beacon signals 702, 704, and 706, the STA #1 741 and the STA #2 751 detect resource allocation information reserved by the AP #1 711 through the AP #3 731 having transmitted the beacon signals 702, 704, and 706, for example, information associated with the TXOPs. In this case, the STA #1 741 and the STA #2 751 may detect the TXOP each time when receiving the beacon signals or when receiving a signal for requesting TXOP detection.

Although the STAs receive the beacon signals of the AP #2 721 and the AP #3 731 before the beacon signal of the AP#1 711 in FIG. 7, in practice, a position of a beacon signal transmitted by each AP may not be the same as the illustration and the beacon signal may be transmitted from an unspecified position.

Beacon signals or adjacent AP information broadcast signals of adjacent APs may be transmitted in the same channel or sub channel in which STAs and a home AP operate, or in a different channel or sub channel than that channel or sub channel. In this case, each STA is allocated a predetermined time for scanning by the home AP to scan adjacent channels and receives a beacon signal or an adjacent AP information broadcast signal transmitted from an adjacent channel to collect information about the adjacent APs. When having no transmission or reception data, each STA situates an antenna and a RF-baseband processing chain in a reception mode, scans information received in every interpretable channel, and receives a beacon signal or an adjacent AP information broadcast signal transmitted in an adjacent channel to collect information about adjacent APs. If having one or more antennas and one or more RF-baseband processing chains, each STA uses some of the antennas and the RF-baseband processing chains to scan adjacent channels and receives a beacon signal transmitted in an adjacent channel to collect information about adjacent APs. In this case, each STA may receive a beacon signal or an adjacent AP information broadcast signal of adjacent APs transmitted in the same channel or sub channel.

The STA #1 741 and the STA #2 751 transmit resource allocation information of adjacent APs, for example, TXOP information 710 and 712, to the AP #1 711 after the elapse of a predetermined time from reception of the beacon signal 706 of the AP #1 711. A time between a transmission time of the adjacent AP information request signal 708 of the AP #1 711 and a transmission time of the TXOP information 710 of the AP #2 721 by the STA #1 741 and a time between a transmission time of the TXOP information 710 of the AP #2 721 by the STA #1 741 and a transmission time of the TXOP information 712 of the AP #3 731 by the STA #2 751 is transmitted through the beacon signal 706 or the adjacent AP information request signal 708 and may be a particular time reserved and allocated by the AP #1 711, a time of predetermined XIFS up to transmission of information by the STA

2 751 from transmission of information through contention or reservation of an AP by the STA #1 741, or a time required for each STA determined by contention to occupy a channel. XIFS indicates an IFS and includes one of various IFSs such as SIFS, DIFS, PIFS, AIFS, and so forth.

The adjacent AP information request signal 708 may designate a particular STA to request adjacent AP information collected by the particular STA. The AP #1 711 may transmit information about the particular STA, for example, a group ID (GID) of a group including the particular STA, and an AID, a MAC address, a PHY address, or an IP address of the particular STA, through the adjacent AP information request signal 708, to request adjacent AP information collected by the particular STA.

The adjacent AP information request signal 708 may designate a particular time, a particular frequency bandwidth, or a particular frequency channel, to request transmission of adjacent AP information collected by the particular STA using the particular time, the particular frequency bandwidth, or the particular frequency channel.

The adjacent AP information request signal 708 may specify multiple STAs and request the specified STAs to sequentially transmit adjacent AP information based on an SIFS or a particular time interval. The AP #1 711 transmits a plurality of STA IDs through the adjacent AP information request signal 708, and the STAs transmit the adjacent AP information in an order of STA IDs in the adjacent AP information request signal 708 or in a reverse order thereof. The AP #1 711 may transmit a plurality of STA IDs and a GID through the adjacent AP information request signal 708, and STAs transmit adjacent AP information in an order of STA IDs in the adjacent AP information request signal 708 or in a reverse order thereof in a group corresponding to the GID. Thus, the order in which the STAs transmit the adjacent AP information is generated based on parameters included in the adjacent AP information request signal 708, and may be any order if the parameters identify the order of the STAs.

It is assumed that the TXOP information 710 transmitted by the STA #1 741 includes information associated with the TXOP 714 reserved by the AP #2 721 and the TXOP information 712 transmitted by the STA #2 751 includes information associated with TXOP 726 reserved by the AP #3 731. The TXOP information 710 and 712 may be at least one of the resource reservation elements described with reference to FIGS. 1A to 2B.

The AP #1 711 having received the TXOP information 710 and 712 from the STA #1 741 and the STA #2 751 extracts information about adjacent APs, (i.e., the AP #2 721 and the AP #3 731) from the TXOP information 710 and 712. The information about the adjacent APs may be roughly divided into an information element associated with resource reservation and an information element associated with a purpose of resource reservation. The information element associated with resource reservation may include, for example, a start time, a duration, an end time, a bandwidth, a frequency channel, and so forth of the reserved TXOPs 714 and 716, and the information element associated with the resource reservation purpose may include, for example, whether to perform downlink/uplink multi-user transmission, adjacent AP-related information, such as the number of users using the adjacent AP, a use frequency bandwidth, a use frequency channel, a timing offset, a beam index, the number of data streams that may be transmitted at the same time, and information associated with a particular frame such as an uplink/downlink resource allocation request. The information about the adjacent APs may also include an ID of an STA or AP that is to use a reserved resource, for example, an AID, a MAC address, a PHY address, an IP address, and so forth.

The AP #1 711 having extracted the information about the adjacent APs reserves a TXOP 716 based on the adjacent AP information. The AP #1 711 reserves the TXOP 716 by avoiding the TXOP 714 reserved by the AP #2 721 and the TXOP 726 reserved by the AP #3 731. The AP #1 711 occupies a channel by avoiding channels mainly used by the AP #2 721 and the AP #3 731, or recognizes a channel or a time not used by the AP #2 721 and the AP #3 731 to reserve its TXOP 716 in the channel and the time. The AP #1 711 time-synchronizes with the AP #2 721 and the AP #3 731 by using timing offsets with the AP #2 721 and the AP #3 731, or changes a use frequency bandwidth to a frequency bandwidth that is totally different from those of the AP #2 721 and the AP #3 731.

Referring to FIG. 7, it is assumed that the AP #1 711 transmits data signals 718 and 720 to the STA #1 741 and the STA #2 751 and receives ACK signals 722 and 724 with respect to the data signals 718 and 720, in its reserved TXOP 716.

In the TXOP 716 reserved by the AP #1 711, uplink signal transmission of the STA #1 741 and the STA #2 751 as well as downlink signal transmission of the AP #1 711 may occur, and non-contention information transmission based on polling by the AP #1 711 may also occur. The AP #1 711 may transmit a signal to and receive a signal from STAs by using a multi-antenna/multi-channel, and may transmit and receive a signal by using a contention-based scheme or an OFDMA scheme. Herein, the multi-antenna/multi-channel may be, for example, a SU-MIMO channel, a MU-MIMO channel, or the like.

Figure 8:
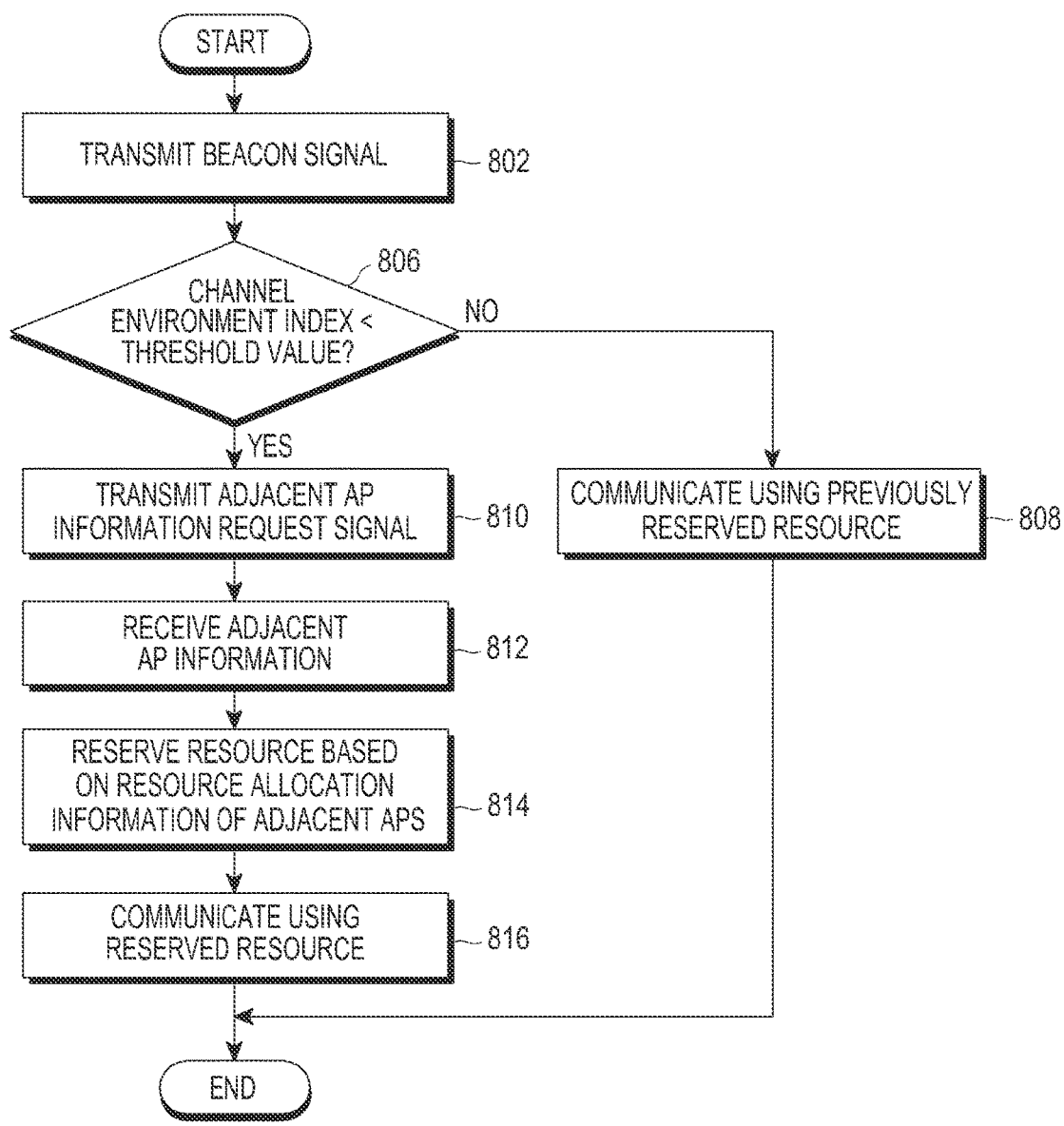
FIG. 8 is a flowchart illustrating an example of a resource operating process for preventing a collision of a WLAN network of an access point (AP) in an OBSS environment according to an embodiment of the present disclosure.

FIG. 8 is a flowchart illustrating an example of a resource operating process for preventing a collision of a WLAN network of an AP in an OBSS environment according to an embodiment of the present disclosure.

Referring to FIG. 8, in operation 802, an AP, for example, a home AP, transmits a beacon signal to an STA through an available channel. The beacon signal may include information associated with a TXOP reserved by the AP by using the elements illustrated in FIG. 1A to 2B. Although the beacon signal is transmitted in operation 802 in FIG. 8, transmission of the beacon signal may occur in any operation.

In operation 806, the AP determines whether a channel environment index, for example, an SNR, an SINR, or a network occupancy rate in a channel, is less than a particular threshold value. If the channel environment index is less than the particular threshold value in operation 806, the AP transmits, in operation 810, an adjacent AP information request signal for requesting adjacent AP information to the STA. The adjacent AP information request signal may include information about a particular STA, for example, a GID of a group including the particular STA, an AID, a MAC address, a PHY address, and an IP address of the particular STA, and information about a threshold value considered in operation 806.

If the channel environment index is greater than the particular threshold value, the AP communicates with the STA by using a previously reserved resource in operation 808.

In operation 812, the AP receives adjacent AP information from the STA. The adjacent AP information may be roughly divided into an information element associated with resource reservation and an information element associated with a resource reservation purpose. The information element associated with resource reservation may be a start time, a duration, an end time, a frequency bandwidth, and a frequency channel of a reserved TXOP, and the information element associated with the resource reservation purpose may include whether to perform downlink/uplink multi-user transmission, adjacent AP-related information, for example, the number of users using the adjacent AP, a use frequency bandwidth, a use frequency channel, a timing offset, a beam index, the number of data streams that may be transmitted at the same time, and information associated with a particular frame such as an uplink/downlink resource allocation request. The information about the adjacent APs may additionally include an ID of an STA or an AP which is to use a reserved resource, for example, an AID, a MAC address, a PHY address, and an IP address of the STA or the AP.

In operation 814, the AP reserves a resource to be used for communication based on the received resource allocation information of the adjacent APs. The AP may select a TXOP that does not overlap with TXOPs of the adjacent APs for reservation of a resource to be used for transmission and operate the resource, may select a TXOP that does not overlap with TXOPs of some arbitrarily selected from among the adjacent APs and operate a resource, may select a TXOP that does not overlap with TXOPs of APs joining a network or being installed in the network earlier than the AP from among the adjacent APs and operate a resource, or may select a TXOP that does not overlap with TXOPs of APs relatively preceding the AP in terms of a beacon signal transmission time within ½ of a beacon transmission interval from among the adjacent APs and operate a resource. When reserving a TXOP to be used for communication, the AP has to avoid exceeding a maximum TXOP limit allowed thereto.

In operation 816, the AP communicates with the STA by using the resource reserved in operation 814.

Although it has been described with reference to FIG. 8 that the AP compares the channel environment index with the particular threshold value, operation 806 may be replaced with an operation in which the AP compares a network environment index with a particular threshold value.

In this case, the AP determines whether a network environment index, for example, noise strength of a network, an occupancy rate of another network in a channel, the number of STAs in the network, a load of the network, or a transmission failure/collision probability of the STAs, is greater than a particular threshold value. If the network environment index is greater than the particular threshold value, the AP transmits, in operation 810, an adjacent AP information request signal for requesting adjacent AP information to an STA. If the network environment index is less than the particular threshold value, the AP communicates with the STA by using a previously reserved resource in operation 808.

Figure 9:
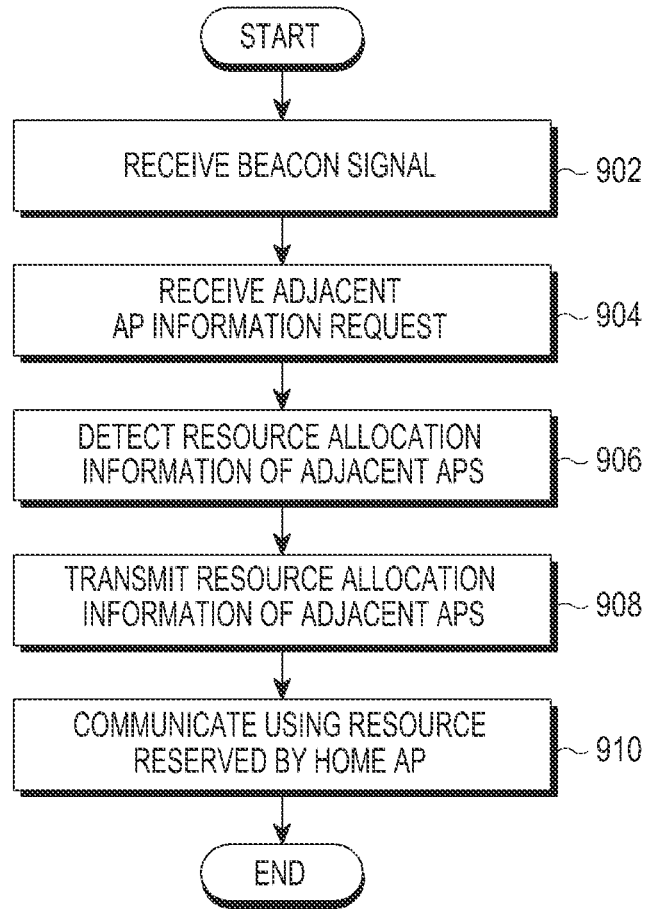
FIG. 9 is a flowchart illustrating an example of a resource operating process for preventing a collision of a WLAN network of an STA in an OBSS environment according to an embodiment of the present disclosure.

FIG. 9 is a flowchart illustrating an example of a resource operating process for preventing a collision of a WLAN network of an STA in an OBSS environment according to an embodiment of the present disclosure.

Referring to FIG. 9, in operation 902, an STA receives a beacon signal of a home AP through a channel. The beacon signal may include information associated with a TXOP reserved by the home AP by using the elements illustrated in FIG. 1A to 2B. Although it has been described with reference to FIG. 9 that the beacon signal is transmitted in operation 902, transmission of the beacon signal may also occur in any operation.

In operation 904, the STA receives an adjacent AP information request signal for requesting adjacent AP information from the home AP. The adjacent AP information may be roughly divided into an information element associated with resource reservation and an information element associated with a purpose of resource reservation. The information element associated with resource reservation may include, for example, a start time, a duration, an end time, a bandwidth, a frequency channel, and so forth of a reserved TXOP. The information element associated with the resource reservation purpose may include, for example, whether to perform downlink/uplink multi-user transmission, adjacent AP-related information, such as the number of users using the adjacent AP, a use frequency bandwidth, a use frequency channel, a timing offset, a beam index, the number of data streams that may be transmitted at the same time, and information associated with a particular frame such as an uplink/downlink resource allocation request. The information about the adjacent APs may also include an ID of an STA or AP that is to use a reserved resource, for example, an AID, a MAC address, a PHY address, an IP address, and so forth.

In operation 906, the STA receives beacon signals of adjacent APs and detects resource allocation information of the adjacent APs from the beacon signals. Although it has been described that the STA detects the resource allocation information from the beacon signals of the adjacent APs, the resource allocation information may be detected from an adjacent AP information broadcast signal of the adjacent APs. In another example, the STA may transmit a resource allocation request signal to the adjacent APs and receive resource allocation information in response to the resource allocation request signal.

In operation 908, the STA transmits the resource allocation information of the adjacent APs, detected in operation 908, to the home AP. The resource allocation information may be, for example, TXOP information which may be at least one of the resource reservation elements described with reference to FIGS. 1A to 2B. The STA may transmit the resource allocation information of the adjacent APs to the home AP through contention-based connection, transmit the resource allocation information of the adjacent APs in response to a polling signal transmitted by the home AP, or may transmit the resource allocation information of the adjacent APs by using time and frequency resources designated by the home AP.

If the resource allocation information of the adjacent APs detected in operation 906 overlaps, the STA processes the resource allocation information to generate new resource allocation information. For example, if a start time of a TXOP 1 is 1 second and a duration of the TXOP 1 is 0.1 second, and a start time of a TXOP 2 is 1.05 second and a duration of the TXOP 2 is 0.15 second, then the STA may express both the TXOP 1 and the TXOP 2 as one TXOP having a start time of 1 second and a duration of 0.2 second, modify a start time and a duration expressed in synchronization with a counterpart time of an adjacent AP so as to be synchronized with a counterpart time of an AP to which the STA belongs, or express a start time and a length as a multiple of a predetermined time unit for efficiency improvement, thereby generating new resource allocation information.

In operation 910, the STA communicates with the home AP by using a resource reserved by the home AP.

Figure 10:
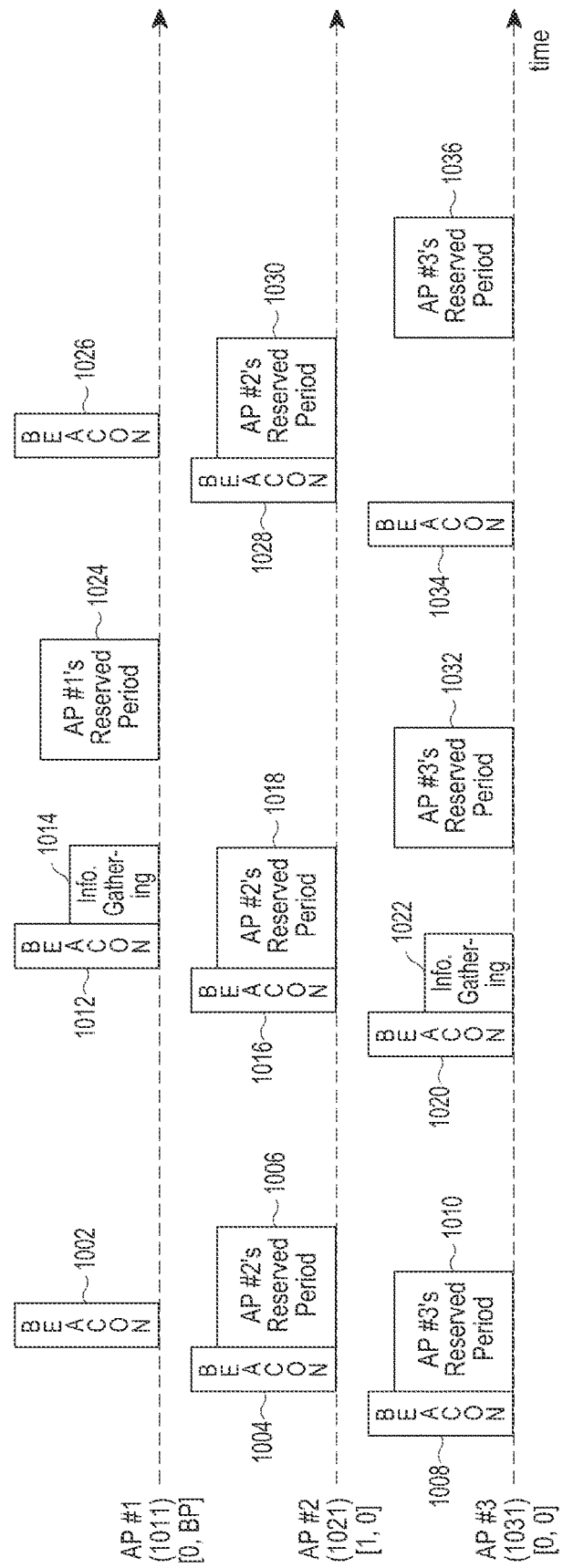
FIG. 10 illustrates an example of a resource operating process for preventing a collision of a distribution system in a multi-distribution-system environment according to an embodiment of the present disclosure.

FIG. 10 illustrates an example of a resource operating process for preventing a collision of a distribution system in a multi-distribution-system environment according to another embodiment of the present disclosure.

Referring to FIG. 10, three APs 1011, 1021, and 1031 co-exist. The APs 1011, 1021, and 1031 are assumed to arbitrarily determine a priority and a back-off period value. The AP #1 1011 is assumed to have a priority of '0' and a back-off value of '1', the AP #2 1021 is assumed to have a priority of '1' and a back-off value of '0', and the AP #3 1031 is assumed to have a priority of '0' and a back-off value of '0'. General back-off refers to an operation of letting a predetermined time pass by while observing a channel occupancy state before transmission, and typically means a scheme performed by a terminal operating in a contention-based manner according to carrier sensing multiple access with collision avoidance (CSMA/CA) defined in the IEEE 802. However, in an embodiment of the present disclosure, the back-off period value is assumed to indicate the number of repetitions of a beacon transmission period passing by before reservation and use of resources by an AP, and a priority having a greater value is assumed to be high.

The AP #1 1011 through the AP #3 1031 transmit beacon signals 1002, 1004, and 1008, and the AP #2 1021 and the AP #3 1031 having a back-off period value of '0' reserve resources 1006 and 1010. After one beacon transmission period has passed, the AP #3 1031 having a low priority reserves a resource 1032 by avoiding a resource reserved by the AP #2 1021 having a high priority. The AP #1 1011 having the back-off value of '0' reserves a resource 1024 by avoiding resources reserved by adjacent APs, (i.e., the AP #2 1021 and the AP #3 1031), based on resource allocation information 1014 and 1022 of the AP #2 1021 and the AP #3 1031. According to another embodiment of the present disclosure, a resource to be used for communication is reserved based on a back-off period value and a priority, allowing interference-free reservation and use of resources in a fast and stable way without an intervening manager.

While it has been described with reference to FIG. 10 assuming that resources reserved by the APs 1011, 1021, and 1031 do not overlap, the resources may be partially or entirely reserved to overlap according to the amount of interference measured for the respective APs 1011, 1021, and 1031. If the resources for the APs 1011, 1021, and 1031 are partially or entirely reserved to overlap, the resources may be operated in an overlapping resource area, taking other physical parameters, for example, a clear channel assessment (CCA) level, a transmission power, a reception sensitivity, and so forth into account.

Such different physical parameters may be known by an AP to each STA, or may be determined by an AP and an STA according to a predetermined rule, for example, a predetermined parameter set or a fixed value. The different physical parameters may be determined according to a function in which the AP and the terminal use at least one of a parameter included in a channel environment index and a parameter included in a network environment index as a variable. The parameter included in the channel environment index may be, for example, an SNR, an SINR, or a network occupancy rate in a channel, and the parameter included in the network environment index may be, for example, noise strength of a network, an occupancy rate of another network in the channel, the number of STAs in the network, a load of the network, or a transmission failure/collision probability of the STAs.

A description has been made with reference to FIG. 10 assuming that each of the APs 1011, 1021, and 1031 determines a priority. However, the priority may be determined and allocated by another entity that manages APs, such as a gateway, an AP coordinator (APC), a base station to which the APs are connected, or the like.

Figure 11:
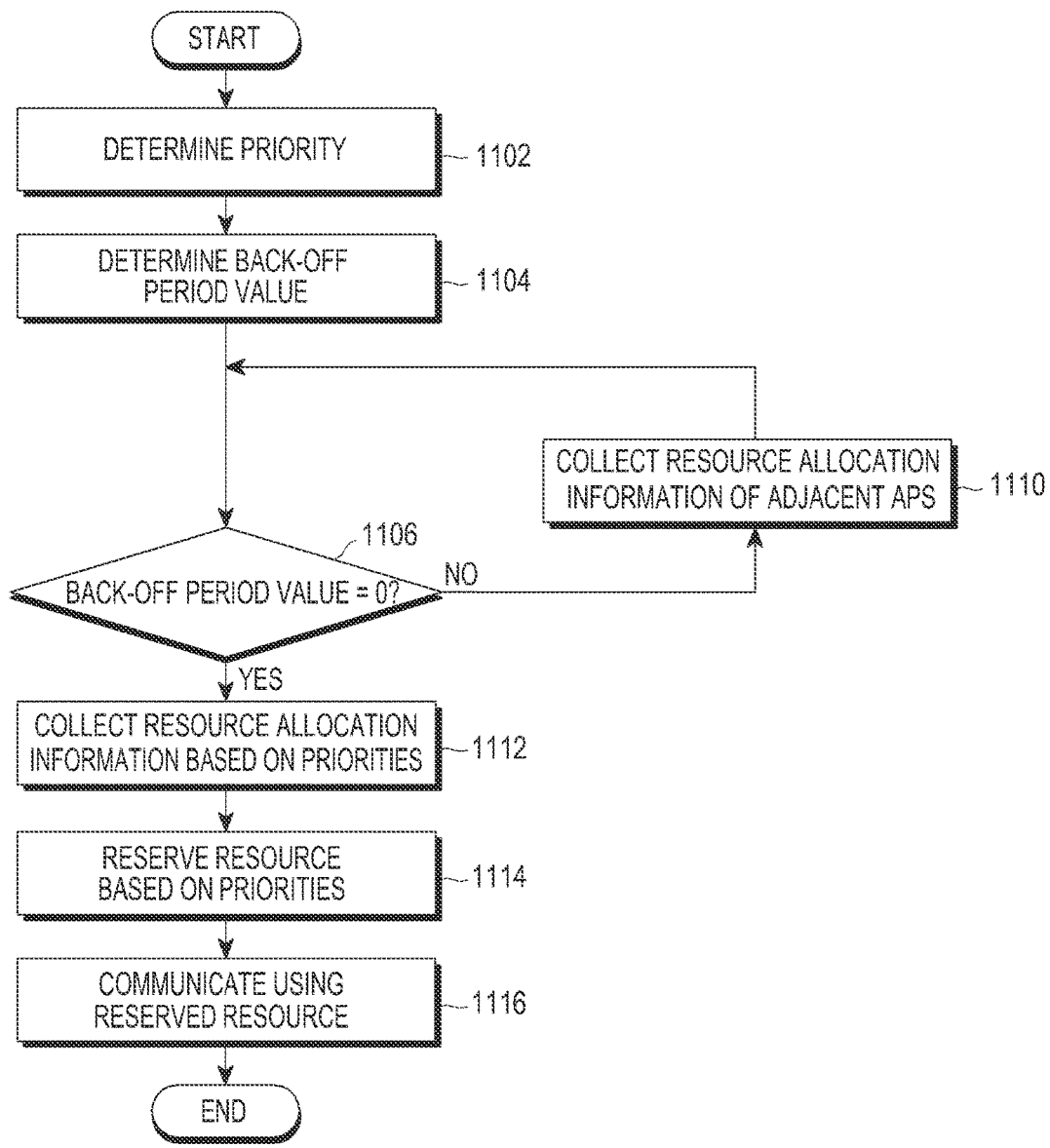
FIG. 11 is a flowchart illustrating an example of resource operation for preventing a collision of a distribution system of an AP in a multi-distribution-system environment according to an embodiment of the present disclosure.

FIG. 11 is a flowchart illustrating an example of resource operation for preventing a collision of a distribution system of an AP in a multi-distribution-system environment according to another embodiment of the present disclosure.

Referring to FIG. 11, in operation 1102, an AP, for example, a home AP determines a priority. The priority may be determined as at least one of a fixed value, a value designated by another entity, a constant value selected in a predetermined range, and a value determined by a function, and the function means a function determined using one or more variables among a load of the network, the number of STAs, a queue length of an AP, necessary channel quality information (quality of service (QoS)), the amount of interference, and the number of adjacent APs.

In operation 1104, the AP determines a back-off period value. The back-off period value may be determined as at least one of a fixed value, a value designated by another entity, a constant value selected in a predetermined range, and a value determined by a function, and the function means a function determined using one or more variables among a load of the network, the number of STAs, a queue length of an AP, necessary channel quality information (QoS), the amount of interference, and the number of adjacent APs. The back-off period value may also be determined as a back-off timer value.

In operation 1106, the AP determines whether the back-off period value determined in operation 1104 is 0. If the back-off period value is 0 in operation 1106, the AP collect resource allocation information of adjacent APs based on priorities of the adjacent APs in operation 1112. The AP may select the resource allocation information based on the priorities from previously received resource allocation information. For example, the AP may collect resource allocation information of adjacent APs having higher priorities than the AP from the previously received resource allocation information.

In operation 1114, the AP reserves a resource by avoiding a resource reserved by an adjacent AP having a higher priority than that of the AP based on the collected information and priorities of the adjacent APs.

In operation 1116, the AP communicates with the STA by using the resource reserved in operation 1114.

If the back-off period value is not 0 in operation 1106, the AP collects the resource allocation information of the adjacent APs in operation 1110. Although not shown, the resource allocation information collection of operation 1110 is repeated for a predetermined unit time, and the AP reaching the predetermined unit time proceeds to operation 1106.

The AP may directly communicate with the adjacent AP to collect information of an adjacent distribution system, may receive a signal broadcast from the adjacent AP, or may transmit a signal for requesting information collection to the STA.

Figure 12:
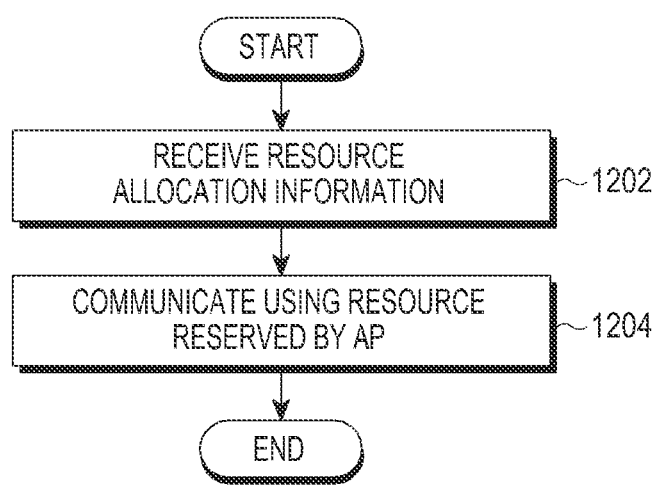
FIG. 12 is a flowchart illustrating an example of resource operation for preventing a collision of a distribution system of an STA in a multi-distribution-system environment according to an embodiment of the present disclosure.

FIG. 12 is a flowchart illustrating an example of resource operation for preventing a collision of a distribution system of an STA in a multi-distribution-system environment according to an embodiment of the present disclosure.

Referring to FIG. 12, in operation 1202, the STA receives, from an AP, resource allocation information for a resource reserved by avoiding a resource reserved by an adjacent AP. In operation 1204, the STA communicates with the AP by using the resource reserved by the AP.

The STA may collect information of an adjacent distribution system by communicating directly with the adjacent AP at the request of the AP or receiving a signal broadcast from the adjacent AP, may transmit the collect information to the AP through contention-based connection, may transmit a response to a polling signal transmitted by the AP, or may perform transmission by using time and frequency resources designated by the AP.

Figure 13:
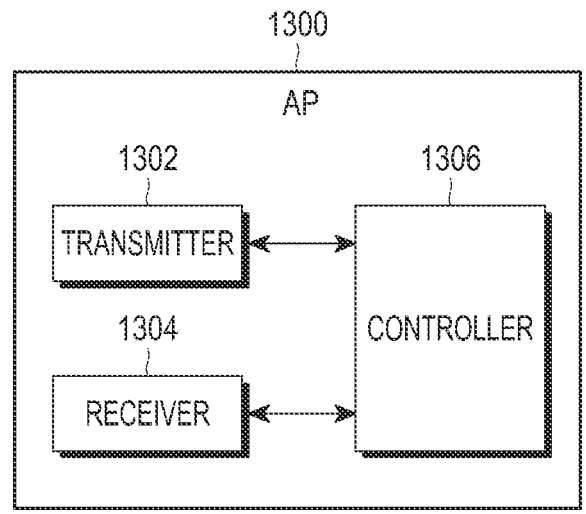
FIG. 13 is a block diagram illustrating an internal structure of an AP associated with resource operation in an OBSS environment according to an embodiment of the present disclosure.

FIG. 13 is a block diagram illustrating an internal structure of an AP associated with resource operation in an OBSS environment according to an embodiment of the present disclosure.

Referring to FIG. 13, an illustrated AP 1300 may include a transmitter 1302, a receiver 1304, and a controller 1306.

The controller 1306 controls overall operations of the AP 1300. In particular, the controller 1306 controls overall operations associated with resource operating according to an embodiment of the present disclosure. The overall operations associated with resource operating have already been described with reference to FIGS. 3 through 8, 10, and 11, and thus will not be described in detail at this time.

The transmitter 1302 transmits various messages under control of the controller 1306. The various messages transmitted by the transmitter 1302 have already been described with reference to FIGS. 3 through 8, 10, and 11, and thus will not be described in detail at this time.

The receiver 1304 receives various messages under control of the controller 1306. The various messages received by the receiver 1304 have already been described with reference to FIGS. 3 through 8, 10, and 11, and thus will not be described in detail at this time.

Figure 14:
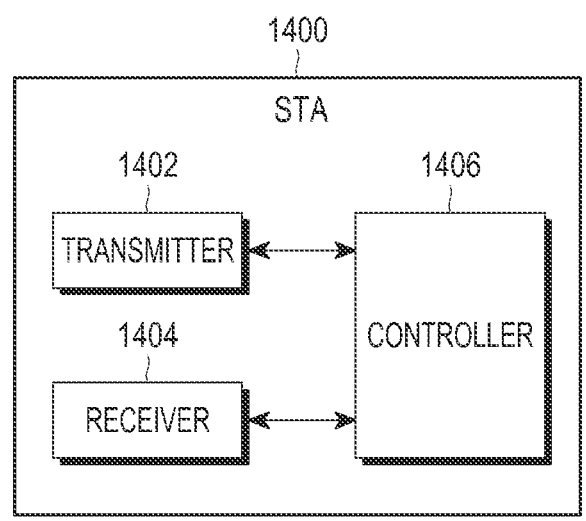
FIG. 14 is a block diagram illustrating an internal structure of an STA associated with resource operation in an OBSS environment according to an embodiment of the present disclosure.

FIG. 14 is a block diagram illustrating an internal structure of an STA associated with resource operation in an OBSS environment according to an embodiment of the present disclosure.

Referring to FIG. 14, an illustrated STA 1400 may include a transmitter 1402, a receiver 1404, and a controller 1406.

The controller 1406 controls overall operations of the STA 1400. In particular, the controller 1406 controls overall operations associated with resource operating according to an embodiment of the present disclosure. The overall operations associated with resource operating have already been described with reference to FIGS. 3 through 7, 9, 10, and 12, and thus will not be described in detail at this time.

The transmitter 1402 transmits various messages under control of the controller 1406. The various messages transmitted by the transmitter 1402 have already been described with reference to FIGS. 3 through 7, 9, 10, and 12, and thus will not be described in detail at this time.

The receiver 1404 receives various messages under control of the controller 1406. The various messages received by the receiver 1404 have already been described with reference to FIGS. 3 through 7, 9, 10, and 12, and thus will not be described in detail at this time.

Particular aspects of the present disclosure may also be implemented as a computer readable code in a computer readable recording medium. The computer readable recording medium may be any type of data storage device that may store data readable by a computer system. Examples of record-mediums readable by the computer may include a read-only memory (ROM), a random-access memory (RAM), a compact disc-read only memory (CD-ROM), magnetic tapes, floppy disks, optical data storage devices, carrier waves (such as data transmission through the Internet). Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such software may be stored, whether or not erasable or re-recordable, in a volatile or non-volatile storage such as a ROM, a memory such as a RAM, a memory chip, a device, or an integrated circuit; and an optically or magnetically recordable and machine (e.g., computer)-readable storage medium such as a CD, a DVD, a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine (computer)-readable storage medium for storing such a program. The program may be electronically transferred through an arbitrary medium such as a communication signal delivered through a wired or wireless connection.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

According to an embodiment of the present disclosure, in an OBSS environment where multiple distribution systems overlap, resource operation processing of each WLAN network becomes possible.

According to an embodiment of the present disclosure, in an OBSS environment where multiple distribution systems overlap, resources may be operated to prevent a collision of each WLAN network.

According to an embodiment of the present disclosure, in an OBSS environment where multiple distribution systems overlap, resources may be operated to decrease a service delay of each WLAN network.

According to an embodiment of the present disclosure, in an OBSS environment where multiple distribution systems overlap, resources may be operated to increase the radio resource efficiency of each WLAN network.

According to an embodiment of the present disclosure, in an OBSS environment where multiple distribution systems overlap, resources may be operated based on the number of available signal receiving devices of each WLAN network.

According to an embodiment of the present disclosure, in an OBSS environment where multiple distribution systems overlap, an AP and an STA may be operated to enable information collection using STAs of each WLAN network.

According to an embodiment of the present disclosure, in an OBSS environment where multiple distribution systems overlap, resources may be operated based on information collected using STAs of each WLAN network.

According to an embodiment of the present disclosure, in an OBSS environment where multiple distribution systems overlap, resource operating processing of each distribution system is possible.

According to an embodiment of the present disclosure, in an OBSS environment where multiple distribution systems overlap, resources may be operated to prevent a collision of each distribution system.

According to an embodiment of the present disclosure, in an OBSS environment where multiple distribution systems overlap, resources may be operated to decrease a service delay of each distribution system.

According to an embodiment of the present disclosure, in an OBSS environment where multiple distribution systems overlap, resources may be operated to increase the radio resource efficiency of each distribution system.

According to an embodiment of the present disclosure, in an OBSS environment where multiple distribution systems overlap, resources may be operated based on the number of available signal receiving devices of each distribution system.

According to an embodiment of the present disclosure, in an OBSS environment where multiple distribution systems overlap, resources may be operated based on a priority of each distribution system.

The effects of the present disclosure are not limited to the above-described effects, and it would be obvious to those of ordinary skill in the art that various effects are included in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating resources by a first access point (AP) in a wireless communication system, the method comprising:
    transmitting, to at least one terminal, at least one beacon signal including a request for resource allocation information related to an adjacent AP of the first AP;
    receiving, from the at least one terminal, the resource allocation information related to the adjacent AP; and
    reserving resources for communication based on the resource allocation information related to the adjacent AP.

2. The method of claim 1,
    wherein the request is transmitted if a channel environment index is less than a first threshold value or if a network environment index is greater than a second threshold value,
    wherein the channel environment index comprises at least one of a signal to noise ratio (SNR), a signal to interference and noise ratio (SINR), and an occupancy rate of a network, and
    wherein the network environment index comprises at least one of a noise strength, an occupancy rate of another network, a number of terminals, a load of a related network, and a transmission failure/collision probability of the at least one terminal.

3. The method of claim 1, wherein the reserving of the resources for communication comprises:
    reserving, as the resources, a transmission opportunity (TXOP) that does not overlap with TXOPs for the adjacent AP;
    reserving, as the resources, a TXOP that does not overlap with TXOPs of at least one adjacent AP selected from among adjacent APs of the first AP;
    reserving, as the resources, a TXOP that does not overlap with TXOPs of the at least one adjacent AP which joins a related network or is installed in the related network earlier than the first AP; and
    reserving, as the resources, a TXOP that does not overlap with TXOPs of the at least one adjacent AP which have a transmission time of the at least one beacon signal preceding a transmission time of the at least one beacon signal of the first AP in ½ of a beacon transmission interval.

4. The method of claim 1, wherein if a resource related to a TXOP that does not overlap with TXOPs of the adjacent AP is smaller than a resource required by the first AP, the reserving of the resources for communication comprises:
    reserving, as the resources, a TXOP that partially or entirely overlaps with TXOPs of at least one adjacent AP; or
    selecting at least one adjacent AP having small mutual interferences from among adjacent APs of the first AP, and reserving, as the resource to be used for communication, a TXOP that partially or entirely overlaps with TXOPs of the selected at least one adjacent AP.

5. The method of claim 1, further comprising:
    determining a priority and a back-off period value of the first AP; and
    receiving information related to the priority and the back-off period value from the adjacent AP.

6. The method of claim 5,
    wherein if the back-off period value is 0, the resources for communication are reserved by avoiding a resource reserved by at least one adjacent AP having priorities higher than the priority of the first AP,
    wherein the priority and the back-off period value are determined as at least one of a fixed value, a value designated by another entity, a constant value selected in a predetermined range, and a value determined by a function, and
    wherein the function is determined using one or more variables among a load in a network, a number of terminals, a queue length of the AP, necessary channel quality information such as quality of service (QoS), an interference amount, and a number of adjacent APs.

7. A method for operating resources by a terminal in a wireless communication system, the method comprising:
    receiving, from a first access point (AP), a first beacon signal including a request for resource allocation information related to an adjacent AP of the first AP;
    detecting resource allocation information related to the adjacent AP based on a second beacon signal received from the adjacent AP;
    transmitting, to the first AP, the detected resource allocation information related to the adjacent AP; and
    communicating with the first AP by using a resource reserved by the first AP based on the resource allocation information related to the adjacent AP.

8. The method of claim 7,
    wherein the request is transmitted if a channel environment index is less than a first threshold value or if a network environment index is greater than a second threshold value,
    wherein the channel environment index comprises at least one of a signal to noise ratio (SNR), a signal to interference and noise ratio (SINR), and an occupancy rate of a network, and
    wherein the network environment index comprises at least one of a noise strength, an occupancy rate of another network, a number of terminals, a load of the related network, and a transmission failure/collision probability of the terminal.

9. The method of claim 7, wherein the resource reserved by the first AP is related to one of a transmission opportunity (TXOP) that does not overlap with TXOPs for the adjacent AP, a TXOP that does not overlap with TXOPs of at least one adjacent AP selected from among adjacent APs of the first AP, a TXOP that does not overlap with TXOPs of the at least one adjacent AP which joins a related network or is installed in the related network earlier than the first AP, and a TXOP that does not overlap with TXOPs of the at least one adjacent AP which have a transmission time of the first beacon signal preceding a transmission time of the first beacon signal of the first AP in ½ of a beacon transmission interval.

10. The method of claim 7, wherein if a resource related to a TXOP that does not overlap with TXOPs of the adjacent AP is smaller than a resource required by the first AP, the resource reserved by the first AP is a resource related to one of a TXOP that partially or entirely overlaps with TXOPs of at least one adjacent AP and a TXOP that partially or entirely overlaps with TXOPs of at least one adjacent AP having small mutual interferences from among adjacent APs of the first AP.

11. An access point (AP) for operating resources in a wireless communication system, the AP comprising:
  a transceiver configured to:
    transmit, to at least one terminal, at least one beacon signal including a request for resource allocation information related to an adjacent AP of the first AP, and
    receive, from the at least one terminal, the resource allocation information related to the adjacent AP; and
  a controller configured to reserve resources for communication based on the resource allocation information related to the adjacent AP.

12. The AP of claim 11,
  wherein the request is transmitted if a channel environment index is less than a first threshold value or if a network environment index is greater than a second threshold value,
  wherein the channel environment index comprises at least one of a signal to noise ratio (SNR), a signal to interference and noise ratio (SINR), and an occupancy rate of a network, and
  wherein the network environment index comprises at least one of a noise strength, an occupancy rate of another network, a number of terminals, a load of a related network, and a transmission failure/collision probability of the at least one terminal.

13. The AP of claim 11, wherein the controller is configured to:
  reserve, as the resources, a transmission opportunity (TXOP) that does not overlap with TXOPs for the adjacent AP,
  reserve, as the resources, a TXOP that does not overlap with TXOPs of at least one adjacent AP selected from among adjacent APs of the first AP,
  reserve, as the resources, a TXOP that does not overlap with TXOPs of the at least one adjacent AP which joins a related network or is installed in the related network earlier than the first AP, and
  reserve, as the resources, a TXOP that does not overlap with TXOPs of the at least one adjacent AP which have a transmission time of the at least one beacon signal preceding a transmission time of the at least one beacon signal of the first AP in ½ of a beacon transmission interval.

14. The AP of claim 11, wherein the controller is configured to, if a resource related to a TXOP that does not overlap with TXOPs of the adjacent AP is smaller than a resource required by the first AP:
  reserve, as resources, a TXOP that partially or entirely overlaps with TXOPs of at least one adjacent AP, or select at least one adjacent AP having small mutual interferences from among adjacent APs of the first AP, and
  reserve, as the resources, a TXOP that partially or entirely overlaps with TXOPs of the selected at least one adjacent AP.

15. The AP of claim 11,
  wherein the controller is configured to determine a priority and a back-off period value of the first AP, and
  wherein the receiver is configured to receive information related to the priority and the back-off period value from the adjacent AP.

16. The AP of claim 15,
  wherein if the back-off period value is 0, the resources for communication is reserved by avoiding a resource reserved by at least one adjacent AP having priorities higher than the priority of the first AP,
  wherein the priority and the back-off period value are determined as at least one of a fixed value, a value designated by another entity, a constant value selected in a predetermined range, and a value determined by a function, and
  wherein the function is determined using one or more variables among a load in a network, a number of terminals, a queue length of the device, necessary channel quality information such as quality of service (QoS), an interference amount, and a number of adjacent APs.

17. A terminal for operating resources in a wireless communication system, the terminal comprising:
  a transceiver configured to receive, from a first access point (AP), a first beacon signal including a request for resource allocation information related to an adjacent AP of the first AP; and
  a controller configured to:
    detect resource allocation information related to the adjacent AP based on a second beacon signal received from the adjacent AP,
    control the transceiver to transmit, to the first AP the detected resource allocation information related to the adjacent AP, and
    communicate with the first AP by using a resource reserved by the first AP based on the resource allocation information related to the adjacent AP.

18. The terminal of claim 17,
  wherein the request is transmitted if a channel environment index is less than a first threshold value or if a network environment index is greater than a second threshold value,
  wherein the channel environment index comprises at least one of a signal to noise ratio (SNR), a signal to interference and noise ratio (SINR), and an occupancy rate of a network, and
  wherein the network environment index comprises at least one of a noise strength, an occupancy rate of another network, a number of terminals, a load of the related network, and a transmission failure/collision probability of the terminal.

19. The terminal of claim 17, wherein the resource reserved by the first AP is related to one of a transmission opportunity (TXOP) that does not overlap with TXOPs for the adjacent AP, a TXOP that does not overlap with TXOPs of at least one adjacent AP selected from among adjacent APs of the first AP, a TXOP that does not overlap with TXOPs of the at least one adjacent AP which joins a related network or is installed in the related network earlier than the first AP, and a TXOP that does not overlap with TXOPs of the at least one adjacent AP which have a transmission time of the first beacon signal preceding a transmission time of the first beacon signal of the first AP in ½ of a beacon transmission interval.

20. The terminal of claim 17, wherein if a resource related to a TXOP that does not overlap with TXOPs of the adjacent AP is smaller than a resource required by the first AP, the resource reserved by the first AP is a resource related to one of a TXOP that partially or entirely overlaps with TXOPs of at least one adjacent AP and a TXOP that partially or entirely overlaps with TXOPs of at least one adjacent AP having small mutual interferences from among adjacent APs of the first AP.

* * * * *